US012713210B2

(12) United States Patent
Xue et al.

(10) Patent No.: US 12,713,210 B2
(45) Date of Patent: Aug. 18, 2026

(54) METHOD AND APPARATUS FOR TRANSMITTING MULTIMEDIA RESOURCE, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Zheng Xue, Shenzhen (CN); Yu Zhou, Shenzhen (CN); Siyu Tang, Shenzhen (CN); Zehui Guo, Shenzhen (CN); Xiaoping Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 280 days.

(21) Appl. No.: 18/657,986

(22) Filed: May 8, 2024

(65) Prior Publication Data

US 2024/0292193 A1 Aug. 29, 2024

Related U.S. Application Data

(63) Continuation of application No. PCT/CN2023/094123, filed on May 15, 2023.

(30) Foreign Application Priority Data

Aug. 3, 2022 (CN) ......................... 202210927973.4

(51) Int. Cl.
*H04W 4/08* (2009.01)
*H04W 4/16* (2009.01)

(52) U.S. Cl.
CPC ............... *H04W 4/08* (2013.01); *H04W 4/16* (2013.01)

(58) Field of Classification Search
CPC .................................. H04W 4/08; H04W 4/16
See application file for complete search history.

(56) References Cited

U.S. PATENT DOCUMENTS

2013/0303134 A1* 11/2013 Ramnani ................ H04W 8/18 455/414.1
2016/0127680 A1 5/2016 Xiao
2019/0379735 A1 12/2019 Huang et al.

FOREIGN PATENT DOCUMENTS

CN 101047580 A 10/2007
CN 102651701 A 8/2012
(Continued)

OTHER PUBLICATIONS

The European Patent Office (EPO) The Extended European Search Report for Application No. 23848982.7 Oct. 13, 2025 12 Pages.
(Continued)

*Primary Examiner* — Curtis B Odom
(74) *Attorney, Agent, or Firm* — Anova Law Group, PLLC

(57) ABSTRACT

A multimedia resource transmission method includes determining, by a first device in response to that a role of the first device during a voice call is changed to a presenter, a second device from at least one terminal device participating in a same voice call as the first device. The presenter is a device configured to output multimedia during the voice call. The method further includes creating, by the first device, a direct link between the first device and the second device, transmitting, by the first device, a multimedia resource to the second device through the direct link, and transmitting, by the first device, the multimedia resource to a server, to enable the server to forward the multimedia resource to the second device.

20 Claims, 10 Drawing Sheets

(56) References Cited

FOREIGN PATENT DOCUMENTS

| | | | |
|---|---|---|---|
| CN | 104394127 | A | 3/2015 |
| CN | 110022329 | A | 7/2019 |
| WO | 2022154363 | A1 | 7/2022 |

OTHER PUBLICATIONS

The World Intellectual Property Organization (WIPO) International Search Report and Written Opinion for PCT/CN2023/094123 Jul. 19, 2023 11 Pages (including translation).

* cited by examiner

METHOD AND APPARATUS FOR TRANSMITTING MULTIMEDIA RESOURCE, ELECTRONIC DEVICE, AND STORAGE MEDIUM

CROSS-REFERENCE TO RELATED APPLICATIONS

This application is a continuation of International Application No. PCT/CN2023/094123, filed on May 15, 2023, which claims priority to Chinese Patent Application No. 202210927973.4, entitled "METHOD AND APPARATUS FOR TRANSMITTING MULTIMEDIA RESOURCE, ELECTRONIC DEVICE, AND STORAGE MEDIUM" filed on Aug. 3, 2022, the entire contents of both of which are incorporated herein by reference.

FIELD OF THE TECHNOLOGY

Embodiments of this application relate to the field of multimedia technologies, and in particular, to a method and apparatus for transmitting a multimedia resource, an electronic device, and a storage medium.

BACKGROUND OF THE DISCLOSURE

With the continuous development of terminals and the Internet, an increasing number of objects choose to use communication software for communication. Common communication software includes instant messaging software, conferencing software, and the like. For such software, multimedia resources may be transmitted in the form of data streams between devices participating a voice call.

SUMMARY

In accordance with the disclosure, there is provided a multimedia resource transmission method including determining, by a first device in response to that a role of the first device during a voice call is changed to a presenter, a second device from at least one terminal device participating in a same voice call as the first device. The presenter is a device configured to output multimedia during the voice call. The method further includes creating, by the first device, a direct link between the first device and the second device, transmitting, by the first device, a multimedia resource to the second device through the direct link, and transmitting, by the first device, the multimedia resource to a server, to enable the server to forward the multimedia resource to the second device.

Also in accordance with the disclosure, there is provided a multimedia resource transmission method including, in response to a direct connection request of a first device forwarded by a server, creating, by a second device, a direct link between the second device and the first device. The second device is determined from at least one terminal device participating in a same voice call as the first device when a role of the first device during the voice call is changed to a presenter. The presenter is a device configured to output multimedia during the voice call. The method further includes receiving, by the second device through the direct link, a multimedia resource transmitted by the first device, and receiving, by the second device, the multimedia resource forwarded by the server.

Also in accordance with the disclosure, there is provided a system including a first device, a second device, and a server. The first device is configured to determine, in response to that a role of the first device during a voice call is changed to a presenter, the second device from at least one terminal device participating in a same voice call as the first device. The presenter is a device configured to output multimedia during the voice call. The first device is further configured to create a direct link between the first device and the second device, transmit a multimedia resource to the second device through the direct link, and transmit the multimedia resource to the server. The second device is configured to, in response to a direct connection request of the first device forwarded by the server, establish the direct link between the second device and the first device, receive, through the direct link, the multimedia resource transmitted by the first device, and receive the multimedia resource forwarded by the server. The server is configured to forward the multimedia resource and the direct connection request received from the first device to the second device.

DESCRIPTION OF EMBODIMENTS

To make the objectives, technical solutions, and advantages of this application clearer, the following further describes the implementations of this application in detail with reference to the accompanying drawings.

In the related art, a multimedia resource includes an audio resource. Any device participating in a voice call can forward, through a relay server, an audio resource to another device participating in the voice call. That is, the any device first transmits the audio resource to the relay server, and then, the relay server forwards the audio resource to the another device. In such a manner of transmitting an audio resource through a relay link, there are a large transmission delay and a large packet loss rate, which affects transmission quality of the audio resource.

Figure 1:
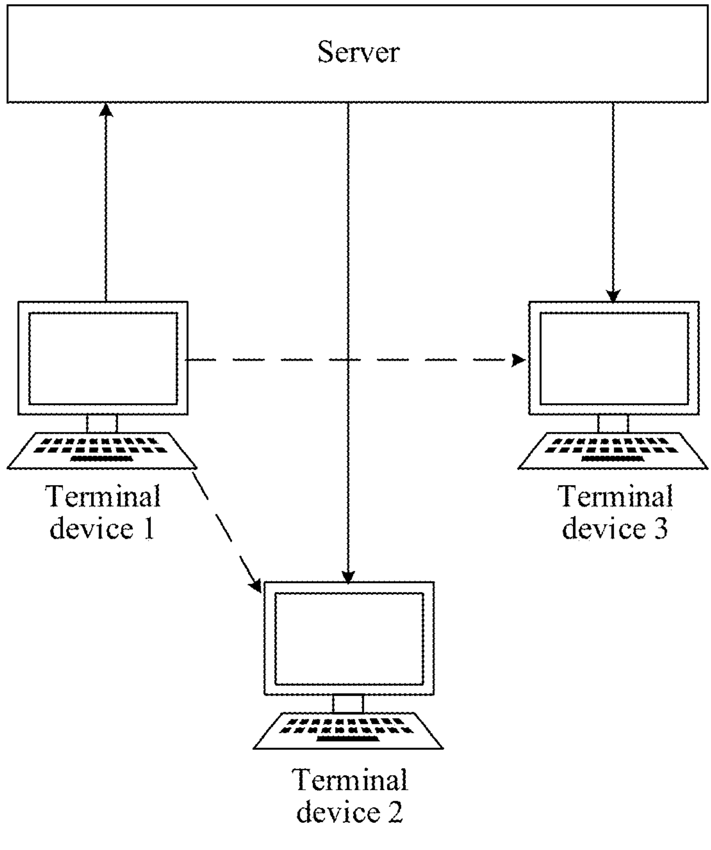
FIG. 1 is a schematic diagram showing an implementation environment of a method for transmitting a multimedia resource according to an embodiment of this application.

FIG. 1 is a schematic diagram showing an implementation environment of a method for transmitting a multimedia resource according to an embodiment of this application. As shown in FIG. 1, the implementation environment includes at least two terminal devices and a server (the server includes a relay server mentioned below). In a case that the terminal devices participate in the same voice call through the server, the method for transmitting a multimedia resource in the embodiments of this application may be performed by any terminal device.

Direct links are respectively created between the terminal devices and the server. A relay link between two terminal devices includes a direct link between one terminal device and the server and a direct link between the other terminal device and the server. That is, transmitting a multimedia resource between two terminal devices through a relay link means that: One terminal device transmits a multimedia resource to a server through a direct link between the terminal device and the server, and the server forwards the multimedia resource to the other terminal device through a direct link between the server and the other terminal device.

In the embodiments of this application, any terminal device can transmit a multimedia resource to the server, and the server can forward the multimedia resource to another terminal device, so that the any terminal device can forward the multimedia resource to the another terminal device through a relay link. As shown in FIG. 1, a terminal device 1 can transmit a multimedia resource to the server, and the server can forward the multimedia resource to a terminal device 2 and a terminal device 3, so that the terminal device 1 can forward the multimedia resource to the terminal device 2 and the terminal device 3 through relay links.

In addition, any terminal device can create a direct link with another terminal device, so that the terminal device can directly transmit a multimedia resource to the another terminal device. As shown in FIG. 1, the terminal device 1 creates direct links with the terminal device 2 and a terminal device 3 respectively, so that the terminal device 1 can directly transmit the multimedia resource to the terminal device 2 and the terminal device 3.

The terminal device may be a smartphone, a game console, a desktop computer, a tablet computer, a laptop portable computer, a smart TV, a smart in-vehicle device, a smart voice interaction device, a smart home appliance, or the like. The server may be a server, or may be a server cluster including a plurality of servers, or either of a cloud computing platform and a virtualization center, which is not limited in the embodiments of this application. The server may be communicatively connected to the terminal device by a wired network or wireless network. The server may have functions such as data processing, data storage, and data transmitting and receiving, which are not limited in the embodiments of this application. Quantities of the terminal devices and the servers are not limited and may be one or more.

To facilitate understanding of the embodiments of this application, terms that may be involved in the embodiments of this application are explained and described below.

Relay link: A relay link is also referred to as a selective forwarding unit (SFU) relay link. An SFU is a transmission architecture, including a relay server and a plurality of terminal devices, and is a star-shaped structure. Each terminal device transmits its own to-be-shared multimedia resource to the relay server, and the relay server forwards the multimedia resource to other terminal devices. During a voice call, when a multimedia resource is transmitted through a relay link between two terminal devices, the multimedia resource needs to be forwarded by a relay server. That is, a terminal device may transmit a multimedia resource to another terminal device through a relay link, or may receive, through a relay link, a multimedia resource sent by another terminal device. The relay link has an establishment success rate and high availability, but also has high transmission costs. In the embodiments of this application, the relay link is a basic transmission link.

Direct link: A direct link is also referred to as a wireless mesh network (Mesh) direct link. A mesh is a mesh structure formed by connecting a plurality of terminal devices pairwise. For example, three terminal devices, namely, a terminal device A, a terminal device B, and a terminal device C, are connected pairwise. When the terminal device A wants to share a multimedia resource (for example, an audio resource and a video resource), the terminal device A transmits the multimedia resource to the terminal device B and the terminal device C respectively. Similarly, if the terminal device B wants to share a multimedia resource, the terminal device B needs to transmit the multimedia resource to the terminal device A and the terminal device C respectively, and so on. The mesh network architecture requires that direct links are established between each terminal device and all other terminal devices, which is complex and difficult. During a voice call, when a multimedia resource is transmitted through a direct link between two terminal devices, the multimedia resource does not need to be forwarded by a relay server (there may be forwarding performed by a network node such as a router and a switch). Because the direct link does not pass through the relay server, the direct link has low transmission costs and can be configured to transmit large traffic data (for example, an audio resource and a video resource). In the embodiments of this application, based on a role of a terminal device during a voice call, a direct link between two terminal devices is dynamically created and deactivated. Therefore, the direct link is an auxiliary transmission link. When a relay link is congested, using a direct link to transmit a multimedia resource can effectively improve transmission quality.

Network address translation (NAT): The network address translation is a technology of rewriting at least one of a source IP address, a source port (Port) address, a destination IP address, and a destination port address when an Internet Protocol (IP) packet passes through a router or a firewall. The NAT can resolve the problem of insufficient Internet Protocol version 4 (IPv4) addresses, and can effectively avoid an attack from outside the network, and hide and protect computers inside the network. According to different mapping rules and filtering rules, the NAT is divided into a full cone type, a restricted type, a port-restricted type, a symmetric type, and the like. The port-restricted type and the symmetric type have the highest security levels, the most demanding connectivity conditions, and the widest application.

NAT penetration: The NAT penetration is also referred to as NAT hole punching. The NAT maps an internal IPv4 address to an external network address. In addition, after receiving packets from the external network, the NAT filters the packets according to specific rules. Consequently, communication between two NAT internal hosts becomes complex. The NAT penetration technology is configured to break NAT barriers and establish a direct link between two NAT internal hosts.

In the field of multimedia technologies, communication software is common software. At least two terminal devices on which the communication software is installed can participate in the same voice call. In a process of at least two terminal devices participating in a voice call, any terminal device can collect a multimedia resource such as a sound and an image, and transmit the multimedia resource to another terminal device participating in the voice call.

In the related art, any terminal device transmits a multimedia resource to a relay server, and the relay server forwards the multimedia resource to another terminal device, so that the any terminal device transmits the multimedia resource to the another terminal device through a relay link. Because the multimedia resource needs to be forwarded by the relay server, there is a large transmission delay and a large packet loss rate in the technology, resulting in poor transmission quality of the multimedia resource.

The embodiments of this application provide a method for transmitting a multimedia resource. The method can be configured to resolve the foregoing problem. In addition, the method provided in the embodiments of this application can be applied to the above implementation environment.

Figure 2:
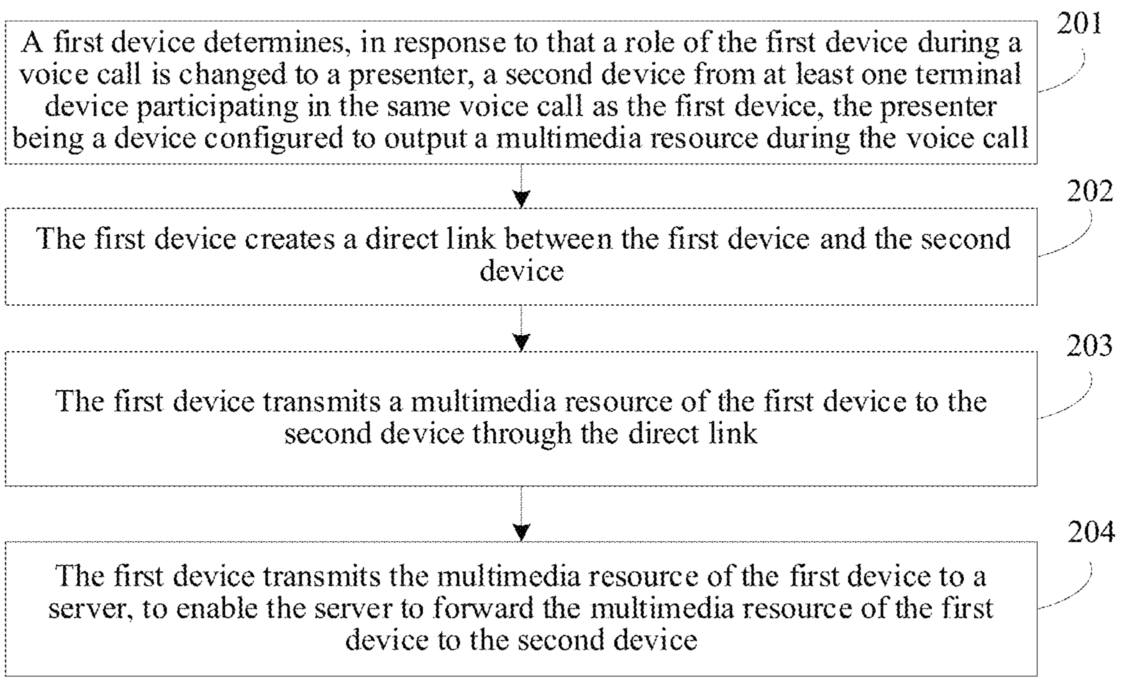
FIG. 2 is a flowchart of a method for transmitting a multimedia resource according to an embodiment of this application.

Using a method for transmitting a multimedia resource that is provided in this embodiment of this application and that is shown in FIG. 2 as an example, the method may be executed by any terminal device (for example, the terminal device 1) in FIG. 1. Because at least two terminal devices are included in the foregoing implementation environment, for the convenience of description, a terminal device performing the method for transmitting a multimedia resource provided in this embodiment of this application is referred to as a first device, and a terminal device other than the first device in the at least two terminal devices is referred to as another terminal device. As shown in FIG. 2, the method includes at least operation 201 to operation 204 as follows:

Operation 201: A first device determines, in response to that a role of the first device during a voice call is changed to a presenter, a second device from at least one terminal device participating in the same voice call as the first device, the presenter being a device configured to output a multimedia resource during the voice call.

Operation 202: The first device creates a direct link between the first device and the second device.

Operation 203: The first device transmits a multimedia resource of the first device to the second device through the direct link.

Operation 204: The first device transmits the multimedia resource of the first device to a server, to enable the server to forward the multimedia resource of the first device to the second device.

In this embodiment of this application, the first device transmits the multimedia resource of the first device to the second device through the direct link or the server. The multimedia resource of the first device includes at least one of an audio resource or a video resource. The audio resource and the video resource may be transmitted in different manners. A manner of transmitting the audio resource is described in detail using the following embodiment of FIG. 3, and a manner of transmitting the video resource is described in detail using the following embodiment of FIG. 4.

Figure 3:
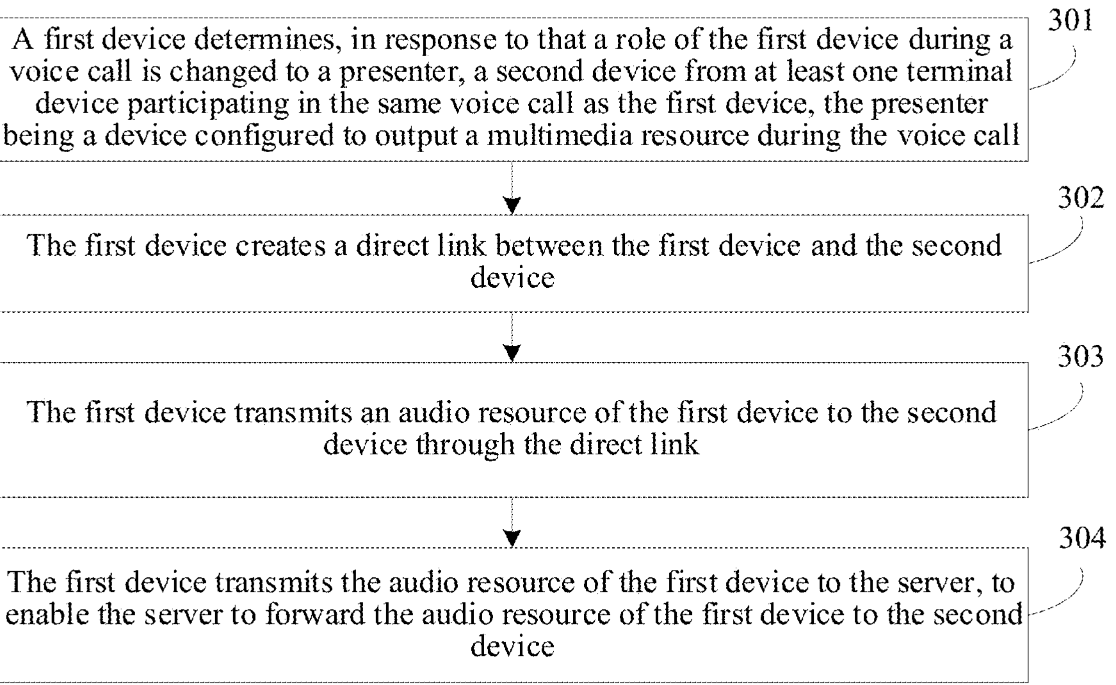
FIG. 3 is a flowchart of a method for transmitting a multimedia resource according to an embodiment of this application.

Using a method for transmitting a multimedia resource that is provided in this embodiment of this application and that is shown in FIG. 3 as an example, the method may be executed by any terminal device (for example, the terminal device 1) in FIG. 1. Because at least two terminal devices are included in the foregoing implementation environment, for the convenience of description, a terminal device performing the method for transmitting a multimedia resource provided in this embodiment of this application is referred to as a first device, and a terminal device other than the first device in the at least two terminal devices is referred to as another terminal device. As shown in FIG. 3, the method includes at least operation 301 to operation 304 as follows: The embodiment of FIG. 3 is described using transmitting an audio resource as an example.

Operation 301: A first device determines, in response to that a role of the first device during a voice call is changed to a presenter, a second device from at least one terminal device participating in the same voice call as the first device, the presenter being a device configured to output a multimedia resource during the voice call.

In this embodiment of this application, at least two terminal devices participate in the same voice call. The at least two terminal devices can be divided into a first device and another terminal device. The another terminal device is equivalent to "at least one terminal device participating in the same voice call as the first device" in operation 301. Same communication software is installed on the first device and the another terminal device. Through the communication software, the first device and the another terminal device can participate in the same voice call. For example, when the communication software is instant messaging software, the first device and the another terminal device can participate in a two-person voice call. When the communication software is conferencing software, the first device and the another terminal device can participate in an audio and video conference. In an audio and video conference, individuals or groups in two or more different places can transmit resources, such as sounds, images, and files, to each other through a transmission link between terminal devices, thereby implementing real-time interactive communication.

In this embodiment of this application, an adaptive role switching policy is adopted to set a role of a terminal device participating in the voice call during the voice call. The role of the terminal device during the voice call is related to a device state of the terminal device. Using an example in which the terminal device is the first device, a role of the first device during the voice call is related to a device state of the first device. As the device state of the first device is changed, and the role of the first device during the voice call may become a presenter. The presenter is a role of the terminal device during the voice call, and is responsible for outputting a multimedia resource. The another terminal device is responsible for receiving the multimedia resource outputted by the terminal device as the presenter. The multimedia resource herein includes, but is not limited to, at least one of resources such as a text, an image, audio, a video, and a file. When the multimedia resource includes an audio resource and a video resource, the multimedia resource may be referred to as an audio-video resource. During the voice call, there may be a plurality of presenters at the same time.

That the role of the first device during the voice call is changed to the presenter includes at least case 11 and case 12 as follows.

Case 11: Before operation 301, the method further includes: determining, by the first device in response to that a device state of the first device is changed to a video resource collection state, that the role of the first device during the voice call is changed to the presenter.

When the first device activates video resource collection, for example, the first device activates screen sharing (in this case, the first device can collect information in a screen) or the first device turns on a camera (in this case, the first device can collect information captured by the camera), the device state of the first device is changed from a video resource collection deactivation state to a video resource collection state. In a possible implementation, the server may detect the change information in real time. The change information is information indicating that the device state of the first device is changed from the video resource collection deactivation state to the video resource collection state. Alternatively, the first device may transmit the change information to the server. The server determines, based on the change information, that the role of the first device during the voice call is changed to the presenter, and transmits, to the first device, notification information indicating that the role of the first device during the voice call is changed to the presenter. When receiving the notification information, the first device determines that the role of the first device during the voice call is changed to the presenter. To facilitate the description, when descriptions are provided below, the role of the first device during the voice call can be briefly described as the role of the first device.

Case 12: Before operation 301, the method further includes: obtaining, by the first device in response to that a device state of the first device is changed to an audio resource collection state, an audio resource collected by the first device; and determining, by the first device in response to that object audio is detected in the collected audio resource, that the role of the first device during the voice call is changed to the presenter.

When the first device activates audio resource collection, for example, when the first device turns on a microphone (in this case, the first device can collect a speech sound of an object, music played by music player software, or the like), the device state of the first device is changed from an audio resource collection deactivation state to an audio resource collection state. In a possible implementation, the server may detect the change information in real time. The change information is information indicating that the device state of the first device is changed from the audio resource collection deactivation state to the audio resource collection state. Alternatively, the first device may transmit the change information to the server. The server first determines, based on the change information, that the role of the first device is changed to an intermediate, and transmits, to the first device, notification information indicating that the role of the first device is changed to the intermediate. When receiving the notification information, the first device determines that the role of the first device during the voice call is changed to the intermediate. The intermediate is a role of the terminal device during the voice call. When the role of the terminal device during the voice call is the intermediate, the terminal device can receive a multimedia resource transmitted by another terminal device whose role is a presenter, and in addition, the terminal device can collect an audio resource, but the audio resource has not yet been transmitted to a terminal device whose role is a presenter or a listener. The intermediate may be changed to a presenter, or may be returned to a listener.

When the role of the first device is changed to the intermediate, the first device can collect an audio resource as the intermediate. In a possible implementation, the first device performs voice activity detection (VAD) on the audio resource, obtains a detection result, and transmits the detection result to the server. If the detection result is that there is object audio in the audio resource, the server determines that the role of the first device is changed from the intermediate to the presenter, and transmits, to the first device, notification information indicating that the role of the first device is changed to the presenter. When receiving the notification information, the first device determines that the role of the first device during the voice call is changed to the presenter. If the detection result is that there is no object audio in the audio resource, the server determines that the role of the first device is changed from the intermediate to the listener, and transmits, to the first device, notification information indicating that the role of the first device is changed to the listener. When receiving the notification information, the first device determines that the role of the first device during the voice call is changed to the listener. The listener is a role of the terminal device during the voice call, and is responsible for receiving and playing a multimedia resource outputted by the terminal device as the presenter. During the voice call, the listener may become the presenter, and similarly, the presenter may also become the listener.

In another possible implementation, the first device transmits the audio resource to the server, and the server performs VAD on the audio resource. When it is detected that there is object audio in the audio resource, it is determined that the role of the first device is changed from the intermediate to the presenter, and notification information indicating that the role of the first device is changed to the presenter is transmitted to the first device. When it is detected that there is no object audio in the audio resource, it is determined that the role of the first device is changed from the intermediate to the listener, and notification information indicating that the role of the first device is changed to the listener is transmitted to the first device.

In this embodiment of this application, when the device state of the first device is changed to the audio resource collection state, it is first determined that the role of the first device is changed to the intermediate, and then, an audio resource collected by the first device as the intermediate is detected. Only after object audio is detected, it is determined that the role of the first device is changed to the presenter. In this way, when an object turns on a microphone (or turns on the microphone by mistake) and does not speak, the role of the first device is not changed to the presenter, which can avoid, to some extent, establishment of a direct link between the first device and another terminal device.

Before the role of the first device is changed to the presenter, the role of the first device may be the listener, no role, or the intermediate. Before the role of the first device is changed to the intermediate, the role of the first device may be the listener or the no role. As described above, in a case that the role of the first device is changed to the presenter, the role of the first device may be changed to the intermediate first, and then changed to the presenter or the listener. Several other cases (denoted as case 13 and case 14) in which the role of the first device is changed to the listener, and a case (denoted as case 15) in which the role of the first device is changed to the no role are described below briefly. The no role refers to a device that does not participate in the voice call. When the device state of the first device is a state of not participating in the voice call, because the first device does not participate in the voice call, the first device cannot play any role during the voice call, and in this case, the role of the first device is the no role.

Case 13: When the device state of the first device is changed from the state of not participating in the voice call to a state of participating in the voice call, it is determined that the role of the first device is changed from the no role to the listener.

The first device can create and participate in a voice call. In this case, the device state of the first device is changed from the state of not participating in the voice call to the state of participating in the voice call. Alternatively, in a case that the server participates in the voice call, the first device that does not participate in the voice call may transmit, to the server, a request for participating in the voice call. When the first device receives a response of the server to the request, the first device participates in the voice call. In this case, the device state of the first device is changed from the state of not participating in the voice call to the state of participating in the voice call. Alternatively, in a case that another terminal device participates in the voice call, the another terminal device transmits, to the first device that does not participate in the voice call, invitation information for participating in the voice call. When the first device responds to the invitation information, the first device participates in the voice call. In this case, the device state of the first device is changed from the state of not participating in the voice call to the state of participating in the voice call.

When the device state of the first device is changed from the state of not participating in the voice call to the state of participating in the voice call, the server may detect the change information in real time, or the first device may transmit the change information to the server. Based on the change information, the server determines that the role of the first device during the voice call is changed from the no role to the listener, and transmits, to the first device, notification information indicating that the role of the first device is changed to the listener.

Case 14: When the device state of the first device is changed from the multimedia resource collection state to the multimedia resource collection deactivation state, it is determined that the role of the first device is changed to the listener. The multimedia resource collection state herein includes at least one of an audio resource collection state or a video resource collection state. The multimedia resource collection deactivation state herein includes an audio resource collection deactivation state and a video resource collection deactivation state.

When the device state of the first device is changed from the multimedia resource collection state to the multimedia resource collection deactivation state, the server may detect the change information in real time, or the first device may transmit the change information to the server. If the server obtains, within a period of time (for example, within 1 minute), that the device state of the first device is always the multimedia resource collection deactivation state, the server determines that the role of the first device is changed from the presenter or the intermediate is the listener, and transmits, to the first device, notification information indicating that the role of the first device is changed to the listener.

Case 15: When the device state of the first device is changed from the state of participating in the voice call to the state of not participating in the voice call, it is determined that the role of the first device is changed to the no role.

When the first device applies to exit the voice call, the device state of the first device is changed from the state of participating in the voice call to the state of not participating in the voice call. The server may detect the change information in real time, or the first device may transmit the change information to the server. In this case, the server determines that the role of the first device is changed from the presenter, the intermediate, or the listener to the no role, and transmits, to the first device, the notification information indicating that the role of the first device is changed to the no role. When the first device receives the notification information, the first device exits the voice call.

When the role of the first device during the voice call is the presenter, the first device is a producer of a multimedia resource, and is mainly configured to collect and obtain a multimedia resource, encode the multimedia resource, and then, transmit the encoded multimedia resource to another terminal device. In addition, the first device is also a receiver of a multimedia resource, and may receive a multimedia resource transmitted by a terminal device whose role is a presenter, decode the multimedia resource, and play the decoded multimedia resource.

When the role of the first device during the voice call is the listener, the first device is a receiver of a multimedia resource, and is mainly configured to receive a multimedia resource transmitted by a terminal device whose role is a presenter. Because a multimedia resource usually needs to be encoded before transmission, after receiving the multimedia resource, a terminal device may first decode the multimedia resource and then play the decoded multimedia resource.

When the role of the first device during the voice call is the intermediate, the first device may receive a multimedia resource transmitted by a terminal device whose role is a presenter, decode the multimedia resource, and play the decoded multimedia resource. In addition, because the first device activated audio collection, the first device may collect an audio resource, but the audio resource has not yet been transmitted to the terminal device whose role is a presenter or a listener.

When the role of the first device is the no role, the first device does not participate in the voice call. Therefore, the first device neither needs to output a multimedia resource, nor needs to receive a multimedia resource outputted by another device.

Depending on different application scenarios, during the voice call, there are different quantities of terminal devices serving as presenters and different quantities of terminal device serving as listeners. For example, for a two-person voice call scenario, generally, two terminal devices are included. A role of any one of the two terminal devices may be either a presenter or a listener, and each terminal device may be switched between a presenter and a listener in real time. That is, a role of any terminal device at the previous moment is a presenter, and the role thereof at the next moment may be a listener. For a remote conference scenario, generally, several or even a dozen terminal devices may be included. Roles of some terminal devices in the terminal devices may always be listeners, and roles of other terminal devices may be switched in real time from presenters to listeners or from listeners to presenters. For an online classroom scenario, generally, dozens or even hundreds of terminal devices may be included. Roles of most of the terminal devices are always listeners, and a role of an individual terminal device is always a presenter. For example, a role of a terminal device of a teacher is always a presenter, while a role of a terminal device of a student is always a listener.

In this embodiment of this application, when the role of the first device during the voice call is changed to the presenter, a second device is determined in the another terminal device. There is at least one second device, and a role of the second device may be a presenter, a listener, or an intermediate. The principle of changing the role of the second device is the same as the principle of changing the role of the first device. Reference may be made to the foregoing descriptions related to the role changing of the first device (such as cases 1 to 5), and details are not described herein again.

Operation 302: The first device creates a direct link between the first device and the second device.

For any second device, if the second device has created a direct link between the second device and the first device, the first device does not need to create a direct link between the first device and the second device. That is, for the second device, the first device may not perform operation 302, and directly perform operation 303 and operation 304. If the second device does not create a direct link between the second device and the first device, then the first device needs to create a direct link between the first device and the second device. That is, for the second device, the first device needs to perform operation 302.

In this embodiment of this application, when the device state of the first device is changed to the state of participating in the voice call, the first device creates a direct connection user datagram protocol socket (UDP Socket). The direct connection UDP socket may be briefly referred to as a direct connection socket. The direct connection socket is a data structure, configured to store state information of all direct links in the first device. The direct link herein includes a direct link between the first device and the server (the server includes at least one of a direct connection hole punching server or a relay server, where the direct connection hole punching server can determine an external network address of a terminal device and feed the external network address back to the terminal device). When resource transmission is performed between the first device and the server, a direct link between the first device and the server needs to be determined based on the direct connection socket, and the resource transmission is performed based on the determined direct link.

Similarly, when the device state of the second device is changed to the state of participating in the voice call, the second device may also create a direct connection socket. After the first device and the second device create their own direct connection sockets, a direct link between the first device and the second device is created based on the respective direct connection sockets of the first device and the second device.

In a possible implementation, that the first device creates the direct link between the first device and the second device includes: The first device transmits a direct connection request with respect to the second device to the server, the direct connection request carrying an external network address of the first device, and receives a direct connection response forwarded by the server, the direct connection response being response information transmitted by the second device to the server in response to the direct connection request, the direct connection request being forwarded by the server to the second device, and the direct connection response carrying an external network address of the second device. The first device extracts the external network address of the second device from the direct connection response, and creates the direct link between the first device and the second device based on the external network address of the first device and the external network address of the second device.

The first device determines a direct link between the first device and the direct connection hole punching server based on the direct connection socket thereof, and transmits a UDP packet to the direct connection hole punching server through the direct link. In an embodiment, the first device generates an original UDP packet and transmits the original UDP packet to a router. The router fills the external network address of the first device in the original UDP packet to obtain a target UDP packet, and transmits the target UDP packet to the direct connection hole punching server. The external network address of the first device includes an Internet Protocol address (IP address) of the first device and a port address of the first device. The IP address of the first device is configured for locating the first device, and the port address of the first device is configured for locating an application of the first device.

After receiving the target UDP packet, the direct connection hole punching server parses the target UDP packet, to parse out the external network address of the first device, and transmits the external network address of the first device to the first device. Therefore, the first device may obtain and store the external network address thereof. Based on the principle the same as that of the first device, the second device may also obtain and store the external network address thereof.

The first device transmits a direct connection request with respect to the second device to the relay server. The direct connection request carries content such as the external network address of the first device, identification information of the first device (serving as a source device), and identification information of the second device (serving as a target device). After receiving the direct connection request, the relay server parses the direct connection request, to obtain the identification information of the second device, and forwards the direct connection request to the second device based on the identification information of the second device. The direct connection request forwarded by the relay server to the second device includes at least the identification information of the first device and the external network address of the first device, and may include the identification information of the second device, or may not include the identification information of the second device.

After receiving the direct connection request, the second device parses the direct connection request, to obtain the identification information of the first device and the external network address of the first device, and stores the identification information of the first device and the external network address of the first device. In addition, the second device further transmits a direct connection response to the relay server in response to the direct connection request. The direct connection response carries an external network address of the second device, the identification information of the first device (serving as a target device), and identification information of the second device (serving as a source device). After receiving the direct connection response, the relay server parses the direct connection response, to obtain the identification information of the first device, and forwards the direct connection response to the first device based on the identification information of the first device. The direct connection response forwarded by the relay server to the first device includes at least the identification information of the second device and the external network address of the second device, and may include the identification information of the first device, or may not include the identification information of the first device.

After receiving the direct connection response, the first device parses the direct connection response, to obtain the identification information of the second device and the external network address of the second device, and stores the identification information of the second device and the external network address of the second device. By then, both the first device and the second device can obtain and store the external network address of the other. After the first device and the second device obtain the external network address of the other, a direct link between the first device and the second device is created.

For example, a first device m transmits a direct connection request with respect to a second device n to the relay server. The direct connection request carries (IP_m, port_m), id(m), and id(n). (IP_m, port_m) is an external network address of the first device m, where IP_m is an IP address of the first device m, port_m is a port address of the first device m, id(m) is identification information of the first device m, and id(n) is identification information of the second device n. After the relay server forwards the direct connection request to the second device n, the second device n parses out and stores id(m) and (IP_m, port_m), and the second device n transmits a direct connection response for the first device m to the relay server. The direct connection response carries (IP_n, port_n), id(m), and id(n). (IP_n, port_n) is an external network address of the second device n, where IP_n is an IP address of the second device n, and port_n is a port address of the second device n. After the relay server forwards the direct connection response to the first device m, the first device m parses out and stores id(n) and (IP_n, port_n).

In an embodiment, that the first device creates the direct link between the first device and the second device based on the external network address of the first device and the external network address of the second device includes: transmitting a plurality of direct connection packets to the second device based on the external network address of the second device; and determining, when receiving a reception response transmitted by the second device, that the direct link between the first device and the second device has been established, the reception response being response information fed back by the second device for the direct connection packets based on the external network address of the first device.

The first device may transmit a plurality of direct connection packets to the second device based on the external network address of the second device. The direct connection packet is the UDP packet mentioned above. Each time receiving one or more direct connection packets, the second device feeds back a reception response for the one or more direct connection packets to the first device based on the external network address of the first device. When the first device receives the reception response fed back by the second device for the direct connection packets, the external network address of the second device obtained by the first device is a correct address, and the second device also successfully receives the external network address of the first device. In this case, the first device determines that the direct link between the first device and the second device has been successfully created.

Based on the principle the same as that of the first device, the second device may transmit a plurality of direct connection packets to the first device based on the external network address of the first device. Each time receiving one or more direct connection packets, the first device feeds back a reception response for the one or more direct connection packets to the second device based on the external network address of the second device. When the second device receives the reception response fed back by the first device for the direct connection packets, the external network address of the first device obtained by the second device is a correct address, and the first device also successfully receives the external network address of the second device. In this case, the second device determines that the direct link between the second device and the first device has been successfully created.

The manner in which the first device and the second device each determine that the direct link between the two devices has been successfully created is also referred to as direct connection hole punching. Through direct connection hole punching, it can be tested whether a direct link has been successfully created between the first device and the second device, and stability of the direct link can be tested, so that when a multimedia resource is subsequently transmitted through the direct link, a transmission success rate of the multimedia resource is improved.

Operation 303: The first device transmits an audio resource of the first device to the second device through the direct link.

In this embodiment of this application, when the role of the first device is the presenter, the first device collects the audio resource of the first device and transmits the audio resource of the first device to the second device through the direct link. There is at least one second device, and the first device transmits the audio resource of the first device to each second device through the direct link. Through direct link transmission, every second device that has created a direct link between the second device and the first device can quickly and accurately obtain the audio resource of the first device, thereby making full use of the direct link to reduce the transmission delay and the packet loss rate of the audio resource.

Operation 304: The first device transmits the audio resource of the first device to the server, to enable the server to forward the audio resource of the first device to the second device. FIG. 2 shows that operation 304 is performed after operation 303. In an embodiment, operation 304 may also be executed before operation 303, or in parallel with operation 303, which is not limited herein.

When collecting the audio resource of the first device, the first device transmits the audio resource of the first device to the server, so that the server forwards the audio resource of the first device to the second device. Through operation 303 and operation 304, the second device not only can receive the audio resource of the first device through the direct link, but also can receive the audio resource of the first device through the relay link, which reduces cases in which the second device fails to receive the audio resource of the first device due to congestion on a specific link, and improves the transmission quality of the audio resource.

In this embodiment of this application, the server can forward the audio resource of the first device to the second device within a set period of time. That is, the server unconditionally forwards the audio resource of the first device to the second device within the set period of time. After the set period of time, the server conditionally forwards the audio resource of the first device to the second device. In an embodiment, the server forwards the audio resource of the first device to the second device in a case that a forwarding condition is satisfied. The server stops forwarding the audio resource of the first device to the second device in a case that the forwarding condition is not satisfied. In this embodiment of this application, the server determines whether the second device satisfies the forwarding condition. If the second device satisfies the forwarding condition, the server forwards the audio resource of the first device to the second device. If the second device does not satisfy the forwarding condition, the server stops forwarding the audio resource of the first device to the second device.

In an embodiment, the forwarding condition includes that a relay packet utilization of the second device is greater than a first utilization threshold, the relay packet utilization of the second device representing a proportion of packets that are forwarded by the server and that are used by the second device, that is, a ratio between a quantity of packets that are forwarded by the server and that are used by the second device and a total quantity of packets used by the second device. The total quantity of packets used by the second device is equal to a sum of the quantity of packets that are forwarded by the server and that are used by the second device and a quantity of packets that are transmitted through the direct link and that are used by the second device.

The first device transmits the audio resource of the first device to the server. After the server receives the audio resource of the first device, for any second device, if a relay packet utilization of the second device for the first device is greater than the first utilization threshold, the server forwards the audio resource of the first device to the second device.

The audio resource of the first device is continuously transmitted to the server and the second device in the form of a stream. The server also continuously forwards the audio resource of the first device to the second device in the form of a stream. When the audio resource of the first device is transmitted in the form of a stream, packets of the first device include the audio resource of the first device.

The second device continuously receives packets transmitted by the first device through the direct link. In addition, the second device continuously receives packets forwarded by the server through the relay link. Each time receiving a packet, the second device can obtain a sequence number of the packet. If the second device has received the packet with the sequence number, the second device discards the packet. If the second device does not receive the packet with the sequence number, the second device can use the packet, that is, the second device parses the packet and plays a corresponding audio resource. In this way, the second device deduplicates the packets received through the direct link and the relay link. By counting a quantity of packets that are received through the relay link and that are used by the second device and a quantity of packets that are received through the direct link and that are used by the second device, the relay packet utilization of the second device for the first device can be obtained. The packets that are received through the relay link and that are used by the second device are the packets that are forwarded by the server and that are used by the second device.

In an embodiment, the relay packet utilization of the second device for the first device is equal to a ratio of the quantity of packets that are received through the relay link and that are used by the second device divided by a total quantity of packets used by the second device. The total quantity of packets used by the second device is equal to a sum of the quantity of packets that are received through the relay link and that are used by the second device and the quantity of packets that are received through the direct link and that are used by the second device. That is to say, the relay packet utilization of the second device for the first device satisfies a formula (1) as follows:

$$U_{relay}^{ij} = \frac{\text{Quantity of packets received through a relay link}}{\text{Total quantity of packets used}} \quad \text{formula (1)}$$

$U_{relay}^{ij}$ represents a relay packet utilization of a second device j for a first device i, and in this case, packets in the formula (1) are packets transmitted by the first device i, where $$0 \le U_{relay}^{ij} \le 1.$$

The second device may transmit the relay packet utilization for the first device to the server, to enable the server to determine, based on the relay packet utilization, whether to forward a packet of the first device to the second device.

In an embodiment, the server may first forward the packet of the first device to the second device, so that the second device counts the relay packet utilization for the first device in a set period of time, and forwards the relay packet utilization to the server. Then, if the server determines that the relay packet utilization of the second device is greater than the first utilization threshold, the server forwards the packet of the first device to the second device. If the server determines that the relay packet utilization of the second device is not greater than the first utilization threshold, the server does not forward the packet of the first device to the second device.

In view of the above, the first device transmits the audio resource of the first device to the second device using a relay link-direct link dual-transmission policy. When the relay packet utilization is not greater than the first utilization threshold, the second device most likely uses a packet received through the direct link (the direct link has high transmission quality and high stability), and most likely discards a packet forwarded by the server. Therefore, there is a high probability that the packet transmitted by the server belongs to invalid transmission. When the relay packet utilization of the second device is not greater than the first utilization threshold, the server stops forwarding the packet of the first device to the second device, which can reduce invalid transmission and save downlink resources.

The relay packet utilization of the second device is greater than or equal to 0 and is less than or equal to 1. The first utilization threshold is an adjustable coefficient. If the first utilization threshold is denoted as $\alpha$, $0 \le \alpha \le 1$.

If $\alpha=0$, the relay packet utilization of the second device is greater than or equal to $\alpha$.

In this case, when the relay packet utilization of the second device is greater than $\alpha$, the server forwards the packet of the first device to the second device. When the relay packet utilization of the second device is equal to $\alpha$, the server may forward the packet of the first device to the second device, or may not forward the packet of the first device to the second device. In a possible implementation, regardless of whether the relay packet utilization of the second device is greater than or equal to $\alpha$, the server forwards the audio resource of the first device to the second device.

If $\alpha=1$, the relay packet utilization of the second device is less than or equal to $\alpha$.

In this case, when the relay packet utilization of the second device is less than α, the server does not forward the packet of the first device to the second device. When the relay packet utilization of the second device is equal to α, the server may forward the packet of the first device to the second device, or may not forward the packet of the first device to the second device. In a possible implementation, regardless of whether the relay packet utilization of the second device is less than or equal to α, the server does not forward the audio resource of the first device to the second device.

In other terminal devices participating in the same voice call as the first device, there may be a terminal device that has not created a direct link between the terminal device and the first device. For such a terminal device, the first device cannot transmit the audio resource of the first device to the terminal device through a direct link, and can only transmit the audio resource of the first device to the terminal device through a relay link. Therefore, a relay packet utilization of such a terminal device for the first device is 1, and is greater than the first utilization threshold. Therefore, the server continuously transmits packets of the first device to such a terminal device, to ensure that the terminal device that has not established a direct link between the terminal device and the first device can also receive the audio resource of the first device.

In conclusion, for any terminal device participating in the same voice call as the first device, the terminal device may have established a direct link between the terminal device and the first device. The terminal device may be the second device mentioned above. The terminal device may have not established a direct link between the terminal device and the first device. If the first device is denoted as i, and the any terminal device is denoted as j, it may be defined, according to a formula (2) as follows, whether a direct link has been established between the first device i and the terminal device j:

$$C_{ij} = \begin{cases} 1, & \text{a direct link has been successfully created} \\ 0, & \text{no direct link has been successfully created} \end{cases} \quad \text{formula (2)}$$

$C_{ij}$ may also be referred to as direct connection reachability, $C_{ij}=1$ represents that a direct link has been established between the first device i and the terminal device j, and $C_{ij}=0$ represents that no direct link has been established between the first device i and the terminal device j.

For the audio resource, the relay link-direct link dual-transmission policy is adopted. When the first device i transmits an audio resource of the first device to the terminal device j, the first device i transmits the audio resource to the terminal device j through a relay link, and in addition, the first device i checks direct connection reachability between the first device i and the terminal device j. If $C_{ij}=1$, the first device i uses the direct link to transmit the audio resource to the terminal device j, and if $C_{ij}=0$, the first device i cannot use the direct link to transmit the audio resource to the terminal device j. Based on the relay link-direct link dual-transmission policy, full use of link resources is implemented, and transmission quality of the audio resource is improved.

Figure 4:
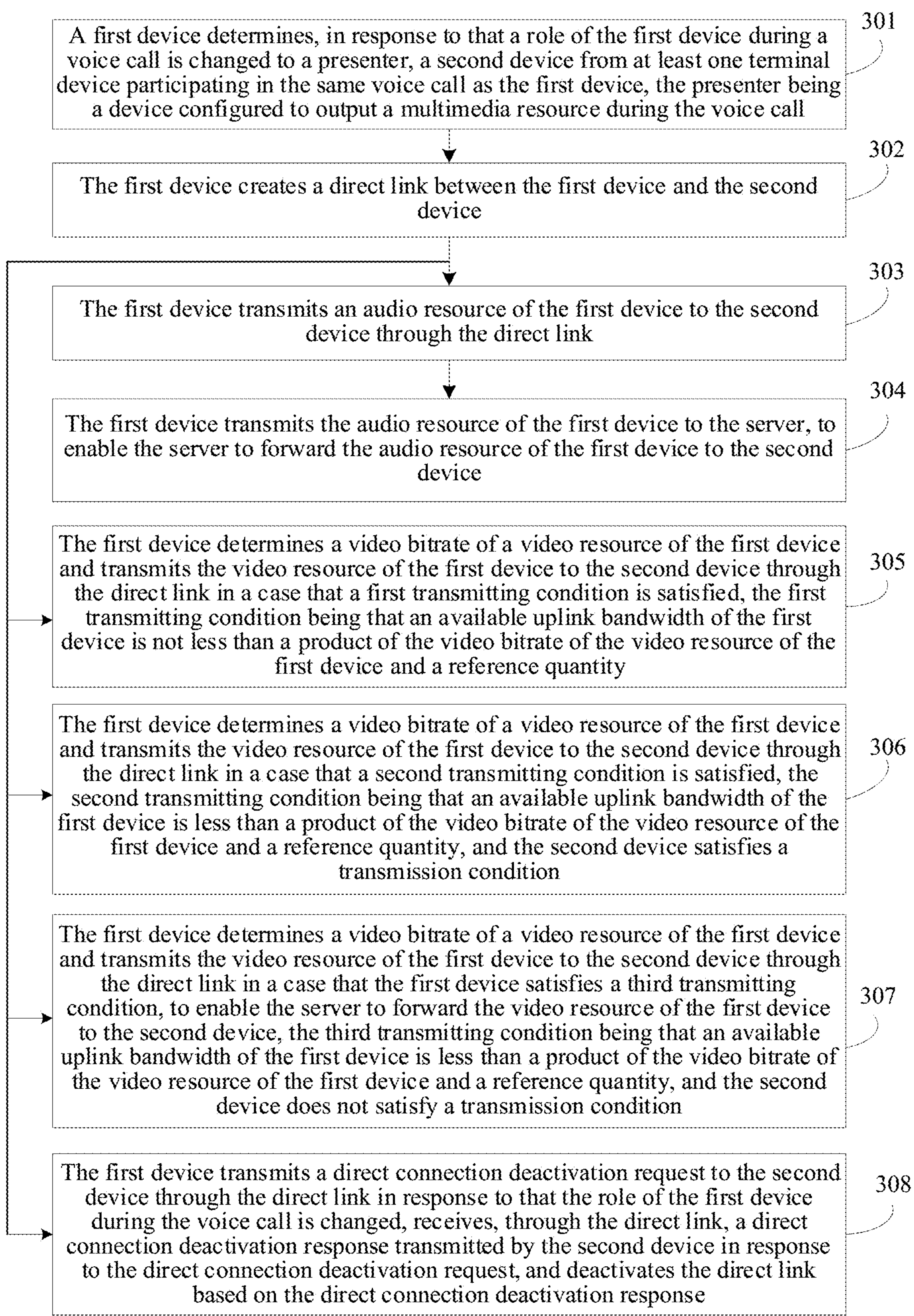
FIG. 4 is a flowchart of another method for transmitting a multimedia resource according to an embodiment of this application.

In a possible implementation, the multimedia resource further includes a video resource, and reference is made to FIG. 4. FIG. 4 is a flowchart of another method for transmitting a multimedia resource according to an embodiment of this application. The method further includes operation 305. FIG. 4 shows that operation 305 is performed after operation 302. In an embodiment, operation 305 may alternatively be performed after operation 303 or operation 304, which is not limited herein.

Operation 305: The first device determines a video bitrate of a video resource of the first device and transmits the video resource of the first device to the second device through the direct link in a case that a first transmitting condition is satisfied, the first transmitting condition being that an available uplink bandwidth of the first device is not less than a product of the video bitrate of the video resource of the first device and a reference quantity.

In this embodiment of this application, when the role of the first device is the presenter, the first device may collect the video resource of the first device. After obtaining the video resource of the first device, the first device determines a video bitrate of the video resource of the first device. The video bitrate represents a quantity of data bits transmitted per unit time during transmission of the video resource of the first device. The video bitrate may also be referred to as a sampling rate, whose unit is usually kilobits per second (kilobits per second, kbps) or megabits per second (megabits per second, mbps).

The first device calculates a product of the video bitrate of the video resource of the first device and a reference quantity. The reference quantity may be set data, for example, the reference quantity is a quantity of terminal devices participating in the voice call, or the reference quantity is a quantity of second devices. In this embodiment of this application, any terminal device that has a direct link created between the terminal device and the first device is the second device mentioned above. Therefore, the quantity of second devices is at least one.

In addition, the first device further determines an available uplink bandwidth of the first device. The available uplink bandwidth of the first device is a total uplink bandwidth of the first device minus a utilized uplink bandwidth of the first device. The utilized uplink bandwidth of the first device includes an uplink bandwidth required by the first device to transmit the audio resource to the server, an uplink bandwidth required by the first device to transmit the audio resource through the direct link to the second device, an uplink bandwidth required by the first device to transmit the video resource to the server, and the like. In an embodiment, because the uplink bandwidth required to transmit the audio resource is small and can be ignored, the available uplink bandwidth of the first device can be roughly estimated as a difference between the total uplink bandwidth of the first device and the uplink bandwidth required by the first device to transmit the video resource to the server.

In this embodiment of this application, if the available uplink bandwidth of the first device is not less than the product of the video bitrate and the reference quantity, the first device transmits the video resource of first device to the second device through the direct link between the first device and the second device. The available uplink bandwidth of the first device is not less than the product, representing that the available uplink bandwidth of the first device is large enough to support transmitting the video resource of the first device to second devices through direct links between the first device and the second devices, thereby reducing the transmission delay and the packet loss rate of the video resource.

In a possible implementation, referring to FIG. 4, the method further includes operation 306. FIG. 4 shows that operation 306 is performed after operation 302. In an embodiment, operation 306 may alternatively be performed after operation 303 or operation 304, which is not limited herein.

Operation 306: The first device determines a video bitrate of a video resource of the first device and transmits the video resource of the first device to the second device through the direct link in a case that a second transmitting condition is satisfied, the second transmitting condition being that an available uplink bandwidth of the first device is less than a product of the video bitrate of the video resource of the first device and a reference quantity, and the second device satisfies a transmission condition.

In this embodiment of this application, if the available uplink bandwidth of the first device is less than the product of the video bitrate and the reference quantity, the available uplink bandwidth of the first device is not large enough to support transmitting the video resource of the first device to second devices through direct links between the first device and the second devices. That is, the first device cannot transmit the video resource of the first device to all second devices through direct links. In this case, for each second device, the first device needs to determine whether the second device satisfies the transmission condition.

In an embodiment, that the second device satisfies the transmission condition includes: a direct connection packet utilization of the second device is not less than a second utilization threshold, the direct connection packet utilization of the second device representing a proportion of packets that are transmitted through the direct link and that are used by the second device. That is, the direct connection packet utilization of the second device represents a ratio between a quantity of packets that are transmitted through the direct link and that are used by the second device and a total quantity of packets used by the second device. The total quantity of packets used by the second device is equal to a sum of the quantity of packets that are forwarded by the server and that are used by the second device and a quantity of packets that are transmitted through the direct link and that are used by the second device.

As mentioned above, the second device deduplicates the packets received through the direct link and the relay link. By counting a quantity of packets that are received through the relay link and that are used by the second device and a quantity of packets that are received through the direct link and that are used by the second device, the direct connection packet utilization of the second device for the first device can be obtained.

In an embodiment, the direct connection packet utilization of the second device for the first device is equal to a ratio of the quantity of packets that are received through the direct link and that are used by the second device divided by a total quantity of packets used by the second device. The total quantity of packets used by the second device is equal to a sum of the quantity of packets that are received through the relay link and that are used by the second device and the quantity of packets that are received through the direct link and that are used by the second device. That is to say, the direct connection packet utilization of the second device for the first device satisfies a formula (3) as follows:

$$U_{direct}^{ij} = \frac{\text{Quantity of packets received through a direct}}{\text{Total quantity of packets used}} \quad \text{formula (3)}$$

$$U_{direct}^{ij}$$

represents a direct connection packet utilization of a second device j for a first device i, and in this case, packets in the formula (3) are packets transmitted by the first device i, where $$0 \le U_{direct}^{ij} \le 1.$$

A sum of the direct connection packet utilization of the second device for the first device and the relay packet utilization of the second device for the first device is 1, that is, $$U_{direct}^{ij} + U_{delay}^{ij} = 1.$$

Therefore, after the second device determines the direct connection packet utilization for the first device, the relay packet utilization for the first device is determined. Similarly, after the second device determines the relay packet utilization for the first device, the direct connection packet utilization for the first device is determined.

The second device may transmit the direct connection packet utilization for the first device to the first device through the direct link between the first device and the second device, to enable the first device to obtain the direct connection packet utilization of the second device. The first device may determine whether the direct connection packet utilization of the second device for the first device is not less than the second utilization threshold. If the direct connection packet utilization of the second device for the first device is not less than the second utilization threshold, the second device satisfies the transmission condition. In this case, the first device transmits the video resource of the first device to the second device through the direct link, thereby reducing the transmission delay and the packet loss rate of the video resource. In an embodiment, the second utilization threshold may be based on empirical device data, for example, the second utilization threshold is 0.5.

In a possible implementation, there is at least one second device, and each second device can transmit a direct connection packet utilization for the first device to the first device through a direct link between the second device and the first device, to enable the first device to obtain direct connection packet utilizations of second devices. The direct connection packet utilizations of the second devices are sorted, and the second utilization threshold may be determined based on a sorting result. For example, a ratio between the available uplink bandwidth of the first device and the video bitrate of the video resource of the first device is calculated first, and the ratio is rounded down to obtain a maximum quantity of devices. The direct connection packet utilizations of the second devices are sorted in descending order, and a direct connection packet utilization ranking the $n^{th}$ is determined as the second utilization threshold, n being the maximum quantity of devices. Certainly, the direct connection packet utilizations of the second devices may also be sorted in ascending order, and a direct connection packet utilization ranking the $m^{th}$ is determined as the second utilization threshold, m being the minimum quantity of devices.

In a possible implementation, referring to FIG. 4, the method further includes operation 307. FIG. 3 shows that operation 307 is performed after operation 302. In an embodiment, operation 307 may alternatively be performed after operation 303 or operation 304, which is not limited herein.

Operation 307: The first device determines a video bitrate of a video resource of the first device and transmits the video resource of the first device to the second device through the direct link in a case that the first device satisfies a third transmitting condition, to enable the server to forward the video resource of the first device to the second device, the third transmitting condition being that an available uplink bandwidth of the first device is less than a product of the video bitrate of the video resource of the first device and a reference quantity, and the second device does not satisfy a transmission condition.

In this embodiment of this application, if the first device determines that the direct connection packet utilization of the second device for the first device is less than the second utilization threshold, the first device may transmit the identification information of the second device to the server. In addition, the first device transmits the video resource of the first device to the server, to enable the server to forward the video resource of the first device to the second device based on the identification information of the second device. When the direct connection packet utilization of the second device is small, the video resource of the first device can be received through the relay link.

In other terminal devices participating in the same voice call as the first device, there may be a terminal device that has not created a direct link between the terminal device and the first device. For such a terminal device, the first device may transmit identification information of the terminal device to the server. After the first device transmits the video resource of the first device to the server, the server forwards the video resource of the first device to the terminal device based on the identification information of the terminal device, thereby ensuring that even if the terminal device does not create a direct link between the terminal device and the first device, the terminal device can still receive the video resource of the first device.

In conclusion, for any terminal device participating in the same voice call as the first device, the terminal device may have established a direct link between the terminal device and the first device. The terminal device may be the second device mentioned above. The terminal device may have not established a direct link between the terminal device and the first device. For the first device i and the terminal device j, if a direct link has been established between the first device i and the terminal device j, $C_{ij}=1$, and if no direct link has been established between the first device i and the terminal device j, $C_{ij}=0$.

For a video resource, a direct link transmission policy is adopted as much as possible, to reduce device costs of the server and bandwidth costs. It is assumed that there are Q terminal devices participating in the voice call, a role of the first device i is a presenter, an available uplink bandwidth of the first device i is B, and a video bitrate of a video resource of the first device i is b. When any of the following cases 21 and 22 occurs, the relay link needs to be used for transmission of the video resource.

$$\sum_{m=1}^{Q} C_{im} < Q. \quad \text{Case 21}$$

In case 21, there are some Q terminal devices that have no direct link established between the Q terminal devices and the first device i. Assuming that no direct link is established between the first device i and the terminal device j, that is, $C_{ij}=0$, the first device i transmits a video resource of the first device i to the server, to enable the server to forward the video resource of the first device i to the terminal device j.

Case 22: When Q−1 terminal devices all have created direct links between the Q−1 terminal devices and the first device, $B<b*(Q-1)$ is satisfied. The available uplink bandwidth of the first device i cannot support simultaneously transmitting the video resource of the first device i to the Q−1 terminal devices through the direct links. In this case, the first device i needs to complete transmission of the video resource with the help of a broadcasting capability of the server.

It is assumed that in addition to a bandwidth required by the first device i to transmit the video resource of the first device i to the relay link, the available uplink bandwidth of the first device i can further support transmitting the video resource of the first device i to T terminal devices through T direct links. In this case, direct connection packet utilizations $$U_{direct}^{mi}$$

of the Q−1 terminal devices are sorted in descending order, and terminal devices corresponding to top T $$U_{direct}^{mi}$$

are selected as second devices satisfying the transmission condition. For the second devices satisfying the transmission condition, the first device transmits the video resource of the first device to the second devices through direct links. The remaining Q−T−1 terminal devices are used as second devices that do not satisfy the transmission condition. For these terminal devices, the first device transmits the video resource of the first device to the server, to enable the server to forward the video resource of the first device to these terminal devices.

In the foregoing manner, it is ensured that the utilization of the direct link is maximized, and the transmission quality of the video resource is improved while not exceeding the available uplink bandwidth of the first device. If case 21 and case 22 do not occur, the first device does not use the relay link to transmit the video resource of the first device, thereby effectively reducing the device costs of the server and the bandwidth costs.

Data of the first device may be divided into two types of data. One type of data is key data. Characteristics of the key data are a high requirement for transmission quality (such as a packet loss rate, and a transmission delay) and a small amount of data. During a voice call, an audio resource, instruction data (for example, an encoding parameter during encoding of an audio resource and a video resource), and the like are key data. The other type of data is non-key data. Characteristics of the non-key data are that a requirement for transmission quality is not too high and a large amount of data. For example, during a voice call, a video resource and the like are non-key data. In this embodiment of this application, the relay link-direct link dual-transmission policy is adopted for the key data. Reference may be made to the foregoing descriptions related to the audio resource of the first device. Moreover, direct link transmission is adopted as much as possible for the non-key data. Reference may be made to the foregoing descriptions related to the video resource of the first device. Certainly, in an actual application, other transmission manners may also be adopted for key data and non-key data. For example, an encoding parameter is transmitted through signaling.

In a possible implementation, referring to FIG. 4, after operation 302, operation 308 may be further included. In an embodiment, operation 308 may alternatively be performed after any one of operation 303 to operation 307.

Operation 308: The first device transmits a direct connection deactivation request to the second device through the direct link in response to that the role of the first device during the voice call is changed, receives, through the direct link, a direct connection deactivation response transmitted by the second device in response to the direct connection deactivation request, and deactivates the direct link based on the direct connection deactivation response.

In this embodiment of this application, a direct link has been successfully created between the first device and the second device. Because an adaptive role switching policy is adopted in this application, when the device state of the first device is changed, the role of the first device may also be changed accordingly. As the device state of the first device is changed, the role of the first device may be changed accordingly. In this case, the first device needs to deactivate the direct link between the first device and the second device. That is, the first device transmits a direct connection deactivation request to the second device through the direct link. There are at least case 31 and case 32 as follows.

Case 31: That the first device transmits the direct connection deactivation request to the second device through the direct link in response to that the role of the first device during the voice call is changed includes: The first device determines, in response to that the device state of the first device is changed to a multimedia resource collection deactivation state, that the role of the first device during the voice call is changed and the role of the first device during the voice call is changed to a listener, and transmits the direct connection deactivation request to the second device through the direct link if a role of the second device during the voice call is a listener, the listener being a device configured to receive the multimedia resource outputted by the presenter during the voice call.

When the first device performs at least one of deactivating video collection (for example, turning off screen sharing or turning off a camera) or deactivating audio collection (for example, turning off a microphone), the device state of the first device is changed from the multimedia resource collection state to the multimedia resource collection deactivation state. In this case, the role of the first device is changed from the presenter to the listener. The change of the role is that the role of the first device is changed. Because the role of the first device is the listener, the first device is a recipient of a multimedia resource, and mainly configured to receive a multimedia resource. Because the second device whose role is the listener does not collect a multimedia resource, if the role of the second device is the listener, the first device transmits a direct connection deactivation request to the second device through the direct link to deactivate the direct link between the first device and the second device corresponding to the role of the listener.

Case 32: That the first device transmits the direct connection deactivation request to the second device through the direct link in response to that the role of the first device during the voice call is changed includes: The first device determines, in response to that the device state of the first device is changed to a voice call exiting state, that the role of the first device during the voice call is changed and the role of the first device during the voice call is changed to no role, and transmits the direct connection deactivation request to the second device through the direct link, the no role being a device not participating in the voice call.

The first device can exit a voice call that the first device has participated in. In this case, the device state of the first device is changed from the state of participating in the voice call to the state of exiting the voice call. In this case, the role of the first device is changed from the listener, the presenter, or the intermediate to the no role. The change of the role is that the role of the first device is changed. When the role of the first device is the no role, the first device is neither a recipient of a multimedia resource nor a producer of multimedia information. That is, the first device neither receives a multimedia resource nor collects a multimedia resource. The first device may transmit a direct connection deactivation request to the second device through the direct link to deactivate the direct link between the first device and the second device corresponding to the role of the listener.

When the first device deactivates the direct link between the first device and the second device, the first device transmits a direct connection deactivation request to the second device through the direct link between the first device and the second device. After receiving the direct connection deactivation request, the second device transmits a direct connection deactivation response to the first device through the direct link between the second device and the first device, and updates a link state of the direct link between the first device and the second device, that is, updates the link state of the direct link between the first device and the second device from an active state to a deactive state. When the first device receives, through the direct link between the first device and the second device, the direct connection deactivation response transmitted by the second device, the first device updates the link state of the direct link between the first device and the second device, that is, updates the link state of the direct link between the first device and the second device from an active state to a deactive state. By then, the direct link between the first device and the second device is deactivated.

All the information (including, but not limited to, user equipment information, personal information of users, and the like), data (including, but not limited to, data for analysis, stored data, displayed data, and the like), and signals included in this application are authorized by the users or fully authorized by all parties. In addition, the collection, use, and processing of relevant data need to comply with relevant laws, regulations, and standards of relevant countries and regions. For example, audio resources, video resources, and the like included in this application are all obtained with full authorization.

In the foregoing method, when the role of the first device is changed to the presenter during the voice call, the second device is determined from the at least one terminal device participating in the same voice call as the first device, and the direct link is created between the first device and the second device, to implement dynamic creation of the direct link. The multimedia resource of the first device is transmitted to the second device through the direct link, to reduce a transmission delay and a packet loss rate of the multimedia resource. In addition, the multimedia resource of the first device is transmitted to the server, to enable the server to forward the multimedia resource of the first device to the second device, thereby improving transmission quality of the multimedia resource.

Figure 5:
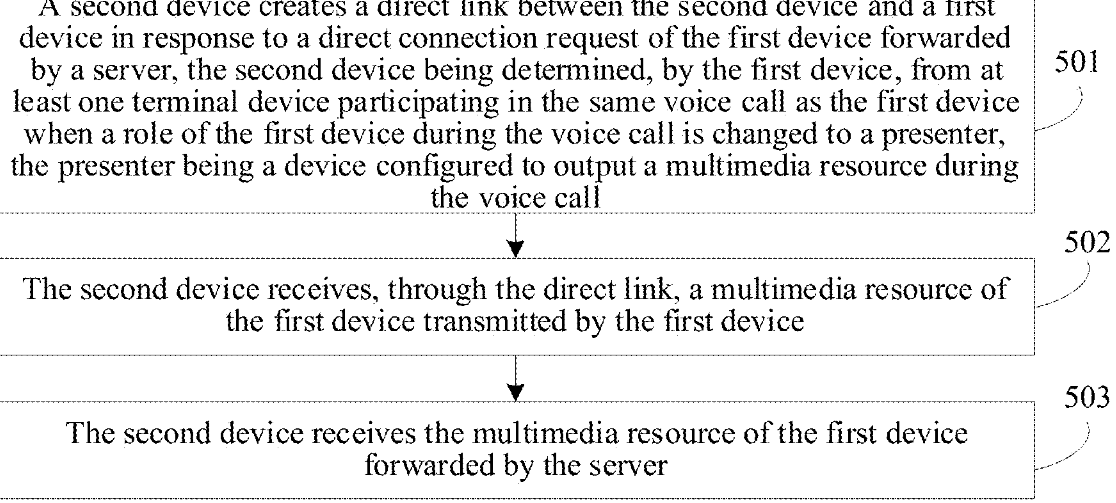
FIG. 5 is a flowchart of still another method for transmitting a multimedia resource according to an embodiment of this application.

Using still another method for transmitting a multimedia resource that is provided in this embodiment of this application and that is shown in FIG. 5 as an example, the method may be executed by any terminal device (for example, the terminal device 2) in FIG. 1. Because at least two terminal devices are included in the foregoing implementation environment, for the convenience of description, a terminal device performing the method for transmitting a multimedia resource provided in this embodiment of this application is referred to as a first device, and a terminal device other than the first device in the at least two terminal devices is referred to as another terminal device. As shown in FIG. 5, the method includes at least operation 501 to operation 503 as follows:

Operation 501: A second device creates a direct link between the second device and a first device in response to a direct connection request of the first device forwarded by a server, the second device being determined, by the first device, from at least one terminal device participating in the same voice call as the first device, when a role of the first device during the voice call is changed to a presenter, the presenter being a device configured to output a multimedia resource during the voice call.

Operation 502: The second device receives, through the direct link, a multimedia resource of the first device transmitted by the first device.

Operation 503: The second device receives the multimedia resource of the first device forwarded by the server.

In this embodiment of this application, the second device receives, through the direct link or the server, the multimedia resource of the first device transmitted by the first device. The multimedia resource of the first device includes at least one of an audio resource or a video resource. The audio resource and the video resource may be transmitted in different manners. A manner of transmitting the audio resource is described in detail using operation 601 to operation 603 in the following embodiment of FIG. 6, and a manner of transmitting the video resource is described in detail using operation 604 to operation 606.

Figure 6:
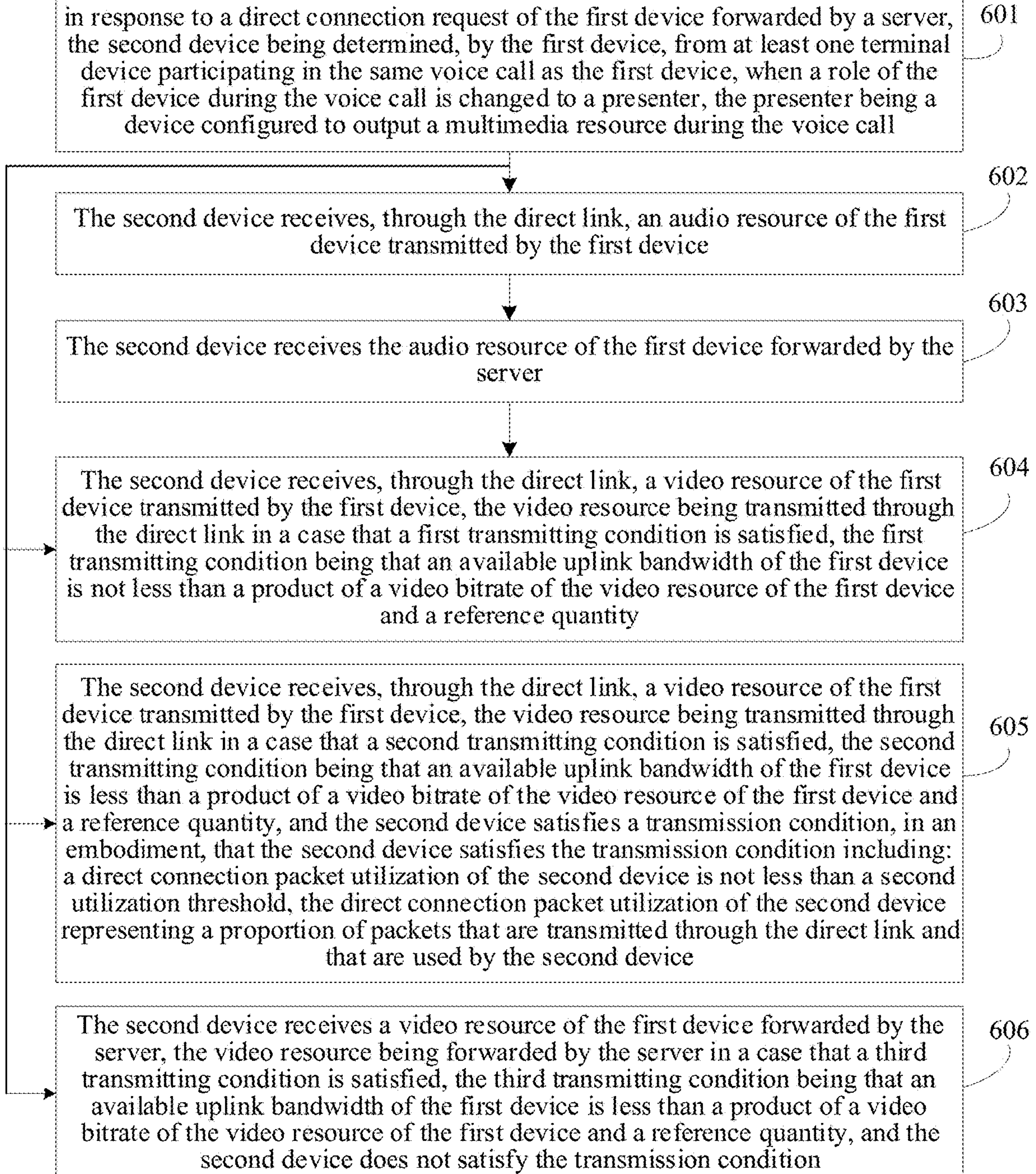
FIG. 6 is a flowchart of still another method for transmitting a multimedia resource according to an embodiment of this application.

Using still another method for transmitting a multimedia resource that is provided in this embodiment of this application and that is shown in FIG. 6 as an example, the method may be executed by any terminal device (for example, the terminal device 2) in FIG. 1. Because at least two terminal devices are included in the foregoing implementation environment, for the convenience of description, a terminal device performing the method for transmitting a multimedia resource provided in this embodiment of this application is referred to as a first device, and a terminal device other than the first device in the at least two terminal devices is referred to as another terminal device. As shown in FIG. 6, the method includes at least operation 601 to operation 603 as follows:

Operation 601: A second device creates a direct link between the second device and a first device in response to a direct connection request of the first device forwarded by a server, the second device being determined, by the first device, from at least one terminal device participating in the same voice call as the first device, when a role of the first device during the voice call is changed to a presenter, the presenter being a device configured to output a multimedia resource during the voice call.

For content related to operation 601, reference may be made to the foregoing descriptions related to operation 301 and operation 302. The implementation principles of the two are the same, and details are not described herein again.

In a possible implementation, that the second device creates the direct link between the second device and the first device includes: A direct connection request with respect to the second device forwarded by the server is received. The direct connection request is transmitted by the first device to the server. The direct connection request carries an external network address of the first device. The second device transmits a direct connection response in response to the direct connection request to the server. The direct connection response carries an external network address of the second device. The direct link between the second device and the first device is created based on the external network address of the first device and the external network address of the second device.

For the descriptions of creating the direct link between the second device and the first device, reference may be made to the foregoing descriptions related to "creating the direct link between the first device and the second device." The implementation principles of the two are the same, and details are not described herein again.

In an embodiment, that the second device creates the direct link between the second device and the first device based on the external network address of the first device and the external network address of the second device includes: The second device transmits a plurality of direct connection packets to the first device based on the external network address of the first device, and determines, when receiving a reception response transmitted by the first device, that the direct link between the second device and the first device has been established. The reception response is response information fed back by the first device for the direct connection packets based on the external network address of the second device.

For the descriptions of successfully creating the direct link between the second device and the first device, reference may be made to the foregoing descriptions related to "successfully creating the direct link between the first device and the second device." The implementation principles of the two are the same, and details are not described herein again.

In a possible implementation, after operation 601 further includes: The second device receives, through the direct link, a direct connection deactivation request transmitted by the first device, the direct connection deactivation request being transmitted to the second device when the role of the first device during the voice call is changed, and the second device transmits a direct connection deactivation response in response to the direct connection deactivation request to the first device through the direct link, and deactivates the direct link based on the direct connection deactivation response.

For the descriptions of deactivating the direct link, reference may be made to the foregoing descriptions related to "deactivating the direct link." The implementation principles of the two are the same, and details are not described herein again.

Operation 602: The second device receives, through the direct link, an audio resource of the first device transmitted by the first device.

For descriptions related to operation 602, reference may be made to the foregoing descriptions related to operation 303. The implementation principles of the two are the same, and details are not described herein again.

Operation 603: The second device receives the audio resource of the first device forwarded by the server.

For descriptions related to operation 603, reference may be made to the foregoing descriptions related to operation 304. The implementation principles of the two are the same, and details are not described herein again.

In a possible implementation, the method further includes operation 604: The second device receives, through the direct link, a video resource of the first device transmitted by the first device, the video resource being transmitted through the direct link in a case that a first transmitting condition is satisfied, the first transmitting condition being that an available uplink bandwidth of the first device is not less than a product of a video bitrate of the video resource of the first device and a reference quantity.

For descriptions related to operation 604, reference may be made to the foregoing descriptions related to operation 305. The implementation principles of the two are the same, and details are not described herein again.

The method further includes operation 605: The second device receives, through the direct link, a video resource of the first device transmitted by the first device, the video resource being transmitted through the direct link in a case that a second transmitting condition is satisfied, the second transmitting condition being that an available uplink bandwidth of the first device is less than a product of a video bitrate of the video resource of the first device and a reference quantity, and the second device satisfies a transmission condition. In an embodiment, that the second device satisfies the transmission condition includes: a direct connection packet utilization of the second device is not less than a second utilization threshold, the direct connection packet utilization of the second device representing a proportion of packets that are transmitted through the direct link and that are used by the second device.

For descriptions related to operation 605, reference may be made to the foregoing descriptions related to operation 306. The implementation principles of the two are the same, and details are not described herein again.

The method further includes operation 606: The second device receives a video resource of the first device forwarded by the server, the video resource being forwarded by the server in a case that a third transmitting condition is satisfied, the third transmitting condition being that an available uplink bandwidth of the first device is less than a product of a video bitrate of the video resource of the first device and a reference quantity, and the second device does not satisfy a transmission condition. In an embodiment, that the second device satisfies the transmission condition includes: a direct connection packet utilization of the second device is not less than a second utilization threshold, the direct connection packet utilization of the second device representing a proportion of packets that are transmitted through the direct link and that are used by the second device.

For descriptions related to operation 606, reference may be made to the foregoing descriptions related to operation 307. The implementation principles of the two are the same, and details are not described herein again.

In the foregoing method, when the role of the first device is changed to the presenter during the voice call, the second device is determined from the at least one terminal device participating in the same voice call as the first device, and the direct link is created between the first device and the second device, to implement dynamic creation of the direct link. The multimedia resource of the first device is transmitted to the second device through the direct link, to reduce a transmission delay and a packet loss rate of the multimedia resource. In addition, the multimedia resource of the first device is transmitted to the server, to enable the server to forward the multimedia resource of the first device to the second device, thereby improving transmission quality of the multimedia resource.

The embodiments of this application further provide a multimedia resource transmission system. The system includes a first device, a second device, and a server.

The first device is configured to perform the method for transmitting a multimedia resource related to FIG. 2, FIG. 3, and FIG. 4. The second device is configured to perform the method for transmitting a multimedia resource related to FIG. 5 and FIG. 6. The server is configured to implement the functions implemented by the server related to FIG. 2 to FIG. 6.

Figure 7:
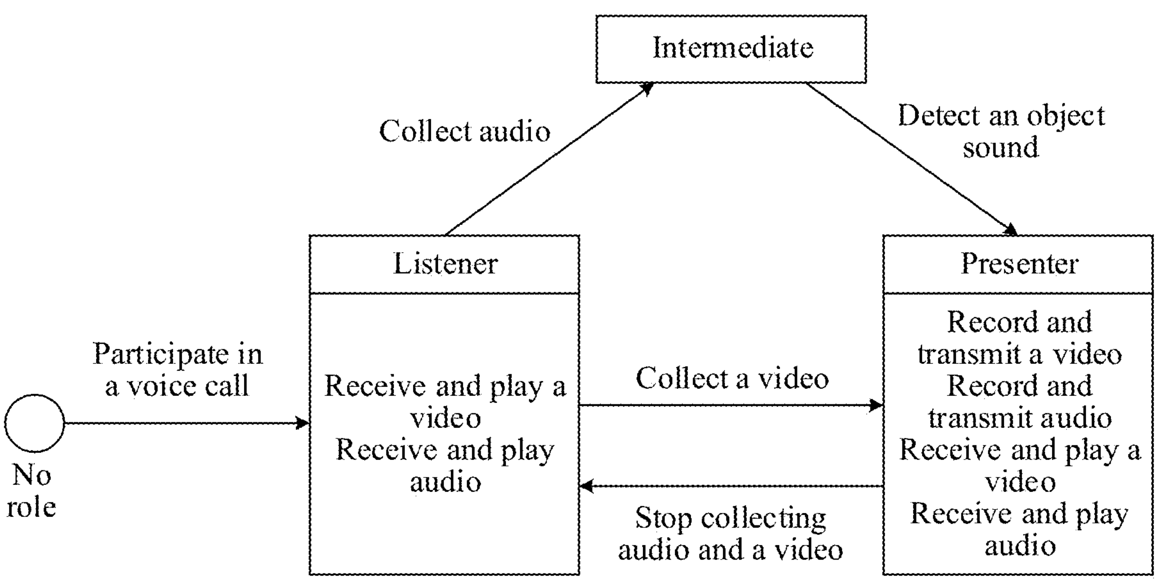
FIG. 7 is a schematic diagram showing role switching according to an embodiment of this application.
Figure 8:
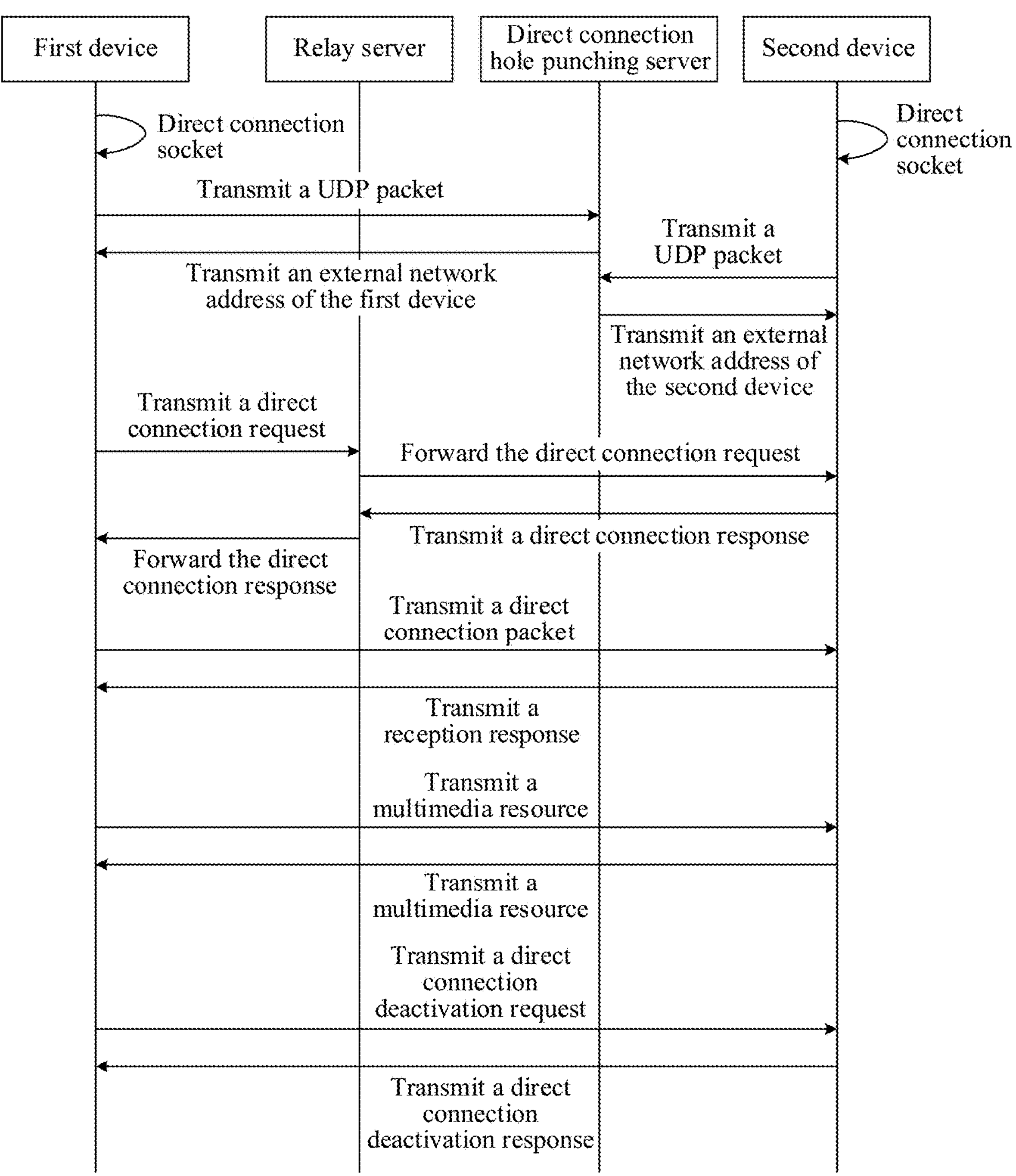
FIG. 8 is a schematic diagram showing creation and deactivation of a direct link according to an embodiment of this application.

The method for transmitting a multimedia resource provided in the embodiments of this application is described from the perspective of operations of the method, and is further described below with reference to FIG. 7 to FIG. 9. In this embodiment of this application, a plurality of terminal devices participate in the same voice call, any one of the plurality of terminal devices participating in the voice call is regarded as a first device, and terminal devices in the plurality of terminal devices other than the first device are regarded as other terminal devices.

The first device plays different roles during the voice call. A role of the first device may be used to describe a role that the first device plays during the voice call. When a device state of the first device is changed, the role of the first device may also be changed accordingly. FIG. 7 is a schematic diagram showing role switching according to an embodiment of this application.

When the first device does not participate in the voice call, the device state of the first device is a state of not participating in the voice call, and in this case, and the role of the first device is no role. When the first device participates in the voice call, the device state of the first device is changed from the state of not participating in the voice call to a state of participating in the voice call, and in this case, the role of the first device is changed from the no role to a listener. As a listener, the first device performs at least one of receiving and playing audio or receiving and playing a video. In this case, because the first device does not collect audio and a video, the device state of the first device may also be referred to as a video resource collection deactivation state and an audio resource collection deactivation state.

When the first device starts to collect a video, the device state of the first device is changed from the video resource collection deactivation state to a video resource collection state, and in this case, the role of the first device is changed from the listener to a presenter. In this case, as a presenter, the first device may record and transmit a video.

When the first device starts to collect audio, the device state of the first device is changed from the audio resource collection deactivation state to an audio resource collection state. In this case, the role of the first device first changes from the listener to an intermediate. As an intermediate, the first device may perform at least one of receiving and playing a video or receiving and playing audio. As an intermediate, the first device may also record audio and perform VAD on the audio. The VAD lasts for a period of time (for example, one minute). If no object audio is detected from the audio within the period of time, the role of the first device is returned back to the listener from the intermediate. If object audio is detected from audio within the period of time, the role of the first device is changed from the intermediate to the presenter, and in this case, as a presenter, the first device can record and transmit audio.

As a presenter, the first device may also perform at least one of receiving and playing a video or receiving and playing audio. When the first device starts to collect audio and a video at the same time, the role of the first device is directly changed from the listener to the presenter, and in this case, if the first device stops collecting audio or the first device stops collecting the video, the role of the first device is not changed, that is, the role of the first device is still the presenter.

When the device state of the first device is only the video resource collection state, and the first device stops collecting the video, the device state of the first device is changed from the video resource collection state to the video resource collection deactivation state. When the device state of the first device is only the audio resource collection state, and the first device stops collecting the audio, the device state of the first device is changed from the audio resource collection state to the audio resource collection deactivation state. When the device state of the first device is the video resource collection state and the audio resource collection state, and the first device stops collecting the audio and the video, the device state of the first device is changed from the video resource collection state to the video resource collection deactivation state, and the device state of the first device is changed from the audio resource collection state to the audio resource collection deactivation state. The three cases may be summarized as that the first device stops collecting audio and the video, and in this case, the role of the first device is changed from the presenter to the listener.

The first device may exit the voice call at any time during the voice call. When the first device exits the voice call, the device state of the first device is changed from the state of participating in the voice call to the state of not participating in the voice call, and in this case, the role of the first device is changed from the listener, the presenter, or the intermediate to the no role.

When the role of the first device is the listener or the intermediate, there may be a direct link between the first device and a terminal device whose role is the presenter in other terminal devices, so that the first device receives and plays at least one of audio or a video. When the role of the first device is the presenter, there may be a direct link between the first device and any one of the other terminal devices, so that the first device records and transmits at least one of audio or a video and receives and plays at least one of audio or a video. Moreover, the role of the terminal device may be the listener, the presenter, or even the intermediate.

Because the role of the first device is different, the other terminal devices that have direct links with the first device are also different. Therefore, the first device can create and deactivate the direct links in real time.

In this embodiment of this application, when the role of the first device is changed from the no role to the listener, the first device can create a direct link between the first device and a terminal device in the other terminal devices that does not create a direct link between the terminal device and the first device and that has a role corresponding to the presenter. When the role of the first device is changed from the intermediate or listener to the presenter, the first device can create a direct link between the first device and a terminal device in the other terminal devices that does not create a direct link with the first device. Using creating a direct link between a first device and a second device as an example, FIG. 8 is a schematic diagram showing creation and deactivation of a direct link according to an embodiment of this application.

When the first device participates in a voice call, the first device may create a direct connection socket. Based on the direct connection socket thereof, the first device transmits a UDP packet to a direct connection hole punching server. The direct connection hole punching server obtains an external network address of the first device by parsing the UDP packet, and transmits the external network address of the first device to the first device, so that the first device obtains the external network address thereof. In the same manner, the second device may also obtain an external network address thereof.

When the first device needs to creates a direct link between the first device and the second device, the first device transmits a direct connection request to a relay server, the relay server may forward the direct connection request to the second device. The direct connection request carries the external network address of the first device. The second device obtains the external network address of the first device by parsing the direct connection request, and stores the external network address of the first device. In addition, the second device transmits a direct connection response in response to the direct connection request to the relay server, and the relay server may forward the direct connection response to the first device. The direct connection response carries the external network address of the second device. The first device obtains the external network address of the second device by parsing the direct connection response, and stores the external network address of the second device.

Subsequently, direct connection hole punching is started between the first device and the second device. The first device transmits a plurality of direct connection packets to the second device based on the external network address of the second device. Each time receiving a direct connection packet, the second device transmits a reception response for the direct connection packet to the first device. When the first device receives the reception responses transmitted by the second device for the direct connection packets, the first device determines that a direct link has been successfully created between the first device and the second device.

In this case, the first device may transmit a multimedia resource of the first device to the second device through the direct link between the first device and the second device, so that the second device receives the multimedia resource of the first device. Similarly, the second device may also transmit a multimedia resource of the second device to the first device through the direct link between the first device and the second device, so that the first device receives the multimedia resource of the second device. The multimedia resource herein includes an audio resource and/or a video resource.

When the first device needs to deactivate the direct link between the first device and the second device, the first device transmits a direct connection deactivation request to the second device through the direct link between the first device and the second device. After receiving the direct connection deactivation request, the second device transmits a direct connection deactivation response to the first device through the direct link between the second device and the first device, and determines to deactivate the direct link between the first device and the second device. When receiving the direct connection deactivation response, the first device determines to deactivate the direct link between the first device and the second device.

Figure 9:
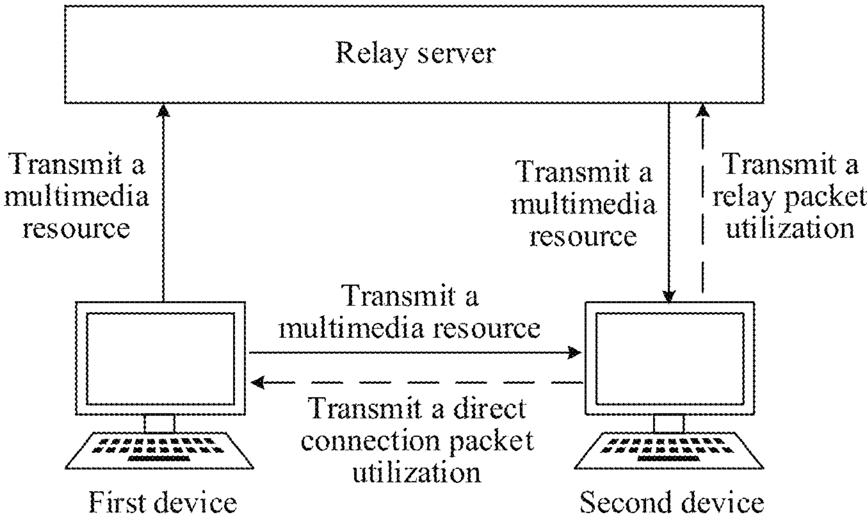
FIG. 9 is a schematic diagram showing transmission of a multimedia resource according to an embodiment of this application.

FIG. 9 is a schematic diagram showing transmission of a multimedia resource according to an embodiment of this application. In this embodiment of this application, the first device may transmit a multimedia resource of the first device to the second device through the direct link between the first device and the second device, so that the second device receives the multimedia resource of the first device through the direct link. In addition, the first device may transmit the multimedia resource of the first device to a relay server, and the relay server forwards the multimedia resource of the first device to the second device, so that the second device receives the multimedia resource of the first device through a relay link. The multimedia resource herein is transmitted in the form of a stream, therefore, the multimedia resource corresponds to packets.

Because the second device may receive the multimedia resource of the first device through the direct link and may also the multimedia resource of the first device through the relay link, for each packet, the second device may receive the packet twice. The second device uses a packet received first and discards a packet received later, thereby deduplicating the received packets. By counting usage of packets, a direct connection packet utilization and a relay packet utilization may be obtained, the direct connection packet utilization is transmitted to the first device, and the relay packet utilization is transmitted to the relay server.

The multimedia resource of the first device includes an audio resource and a video resource, and in this embodiment of this application, different transmission policies are adopted for the audio resource and the video resource.

For the audio resource, a relay link-direct link dual-transmission policy is adopted. The first device transmits an audio resource of the first device to the second device through the direct link. In addition, the first device transmits the audio resource of the first device to the relay server, and the relay server determines whether a relay packet utilization of the second device is not greater than a first utilization threshold. If the relay packet utilization of the second device is not greater than the first utilization threshold, the relay server stops transmitting the audio resource of the first device to the second device. If the relay packet utilization of the second device is greater than the first utilization threshold, the relay server transmits the audio resource of the first device to the second device. Such a manner ensures that the second device can receive the audio resource of the first device while reducing invalid transmission and saving downlink resources.

For a video resource, a direct link transmission policy is adopted as much as possible. It is assumed that Q terminal devices participate in the same voice call, a role of a first device m is a presenter, an available uplink bandwidth of m is B, a video bitrate of a video resource of m is b, a quantity of other terminal devices is $Q-1$, and there are direct links between the first device and all the other terminal devices. When $B \geq b*(Q-1)$, the first device transmits the video resource of the first device to the other terminal devices through the direct links. When $B<b*(Q-1)$, the first device sorts direct connection packet utilizations of the other terminal devices in descending order, and determines top T other terminal devices based on a sorting result. The first device transmits a video resource of the first device to the top T other terminal devices through direct links. In addition, the first device transmits the video resource of the first device to the relay server, and the relay server transmits the video resource of the first device to the last $Q-T-1$ terminal devices. Certainly, if there is no direct link between a terminal device and the first device, the relay server may also transmit the video resource of the first device to the terminal device.

Such a manner enables all the other terminal devices participating in the voice call to receive the video resource of the first device through the direct links or the relay links. In addition, the direct link transmission policy is adopted as much as possible, to reduce device costs of the relay server and bandwidth costs, and improve the transmission quality of the video resource. The direct link is fully utilized while the available uplink bandwidth of the first device is not exceeded, thereby improving the overall transmission quality of the direct link.

Figure 10:
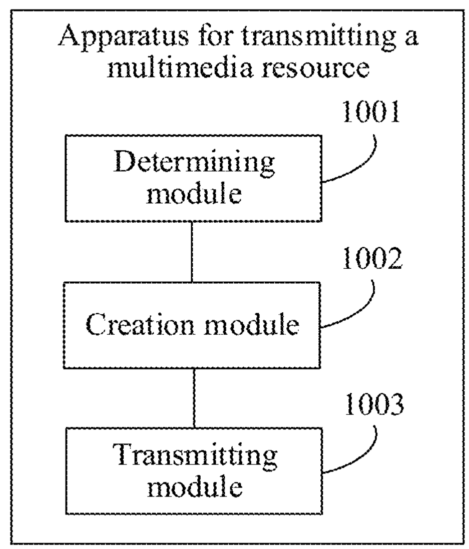
FIG. 10 is a schematic structural diagram of an apparatus for transmitting a multimedia resource according to an embodiment of this application.

FIG. 10 is a schematic structural diagram of an apparatus for transmitting a multimedia resource according to an embodiment of this application. Arranged in a first device, the apparatus, as shown in FIG. 10, includes:

a determining module 1001, configured to determine, in response to that a role of the first device during a voice call is changed to a presenter, a second device from at least one terminal device participating in the same voice call as the first device, the presenter being a device configured to output a multimedia resource during the voice call;

a creation module 1002, configured to create a direct link between the first device and the second device; and a transmitting module 1003, configured to transmit a multimedia resource of the first device to the second device through the direct link, the transmitting module 1003 being further configured to transmit the multimedia resource of the first device to a server, to enable the server to forward the multimedia resource of the first device to the second device.

In a possible implementation, the apparatus further includes:

an obtaining module, configured to obtain, in response to that a device state of the first device is changed to an audio resource collection state, an audio resource collected by the first device.

The determining module 1001 is further configured to determine, in response to that object audio is detected in the collected audio resource, that the role of the first device during the voice call is changed to the presenter.

In a possible implementation, the determining module 1001 is further configured to determine, in response to that a device state of the first device is changed to a video resource collection state, that the role of the first device during the voice call is changed to the presenter.

In a possible implementation, the creation module 1002 is configured to transmit a direct connection request with respect to the second device to the server, the direct connection request carrying an external network address of the first device; receive a direct connection response forwarded by the server, the direct connection response being response information transmitted by the second device to the server in response to the direct connection request, the direct connection request being forwarded by the server to the second device, and the direct connection response carrying an external network address of the second device; extract the external network address of the second device from the direct connection response; and create the direct link between the first device and the second device based on the external network address of the first device and the external network address of the second device.

In a possible implementation, the creation module 1002 is configured to transmit a plurality of direct connection packets to the second device based on the external network address of the second device; and determine, when receiving a reception response transmitted by the second device, that the direct link between the first device and the second device has been established, the reception response being response information fed back by the second device for the direct connection packets based on the external network address of the first device.

In a possible implementation, the multimedia resource includes an audio resource, and the server forwards the audio resource of the first device to the second device in a case that a forwarding condition is satisfied, the forwarding condition being that a relay packet utilization of the second device is greater than first utilization threshold, the relay packet utilization of the second device representing a proportion of packets that are forwarded by the server and that are used by the second device. The server stops forwarding the audio resource of the first device to the second device in a case that the forwarding condition is not satisfied.

In a possible implementation, the transmitting module 1003 is configured to transmit an audio resource of the first device to the second device through the direct link; determine a video bitrate of a video resource of the first device; and transmit the video resource of the first device to the second device through the direct link in a case that a first transmitting condition is satisfied, the first transmitting condition being that an available uplink bandwidth of the first device is not less than a product of the video bitrate of the video resource of the first device and a reference quantity.

In a possible implementation, the transmitting module 1003 is configured to transmit an audio resource of the first device to the second device through the direct link; determine a video bitrate of a video resource of the first device; and transmit the video resource of the first device to the second device through the direct link in a case that a second transmitting condition is satisfied, the second transmitting condition being that an available uplink bandwidth of the first device is less than a product of the video bitrate of the video resource of the first device and a reference quantity, and the second device satisfies a transmission condition.

The transmitting module 1003 is further configured to transmit the audio resource of the first device to the server, to enable the server to forward the audio resource of the first device to the second device; and transmit the video resource of the first device to the server in a case that a third transmitting condition is satisfied, to enable the server to forward the video resource of the first device to the second device, the third transmitting condition being that the available uplink bandwidth of the first device is less than the product of the video bitrate of the video resource of the first device and the reference quantity, and the second device does not satisfy the transmission condition.

In a possible implementation, that the second device satisfies the transmission condition includes: a direct connection packet utilization of the second device is not less than a second utilization threshold, the direct connection packet utilization of the second device representing a proportion of packets that are transmitted through the direct link and that are used by the second device.

In a possible implementation, the transmitting module 1003 is further configured to transmit a direct connection deactivation request to the second device through the direct link in response to that the role of the first device during the voice call is changed.

The apparatus further includes:

a receiving module, configured to receive, through the direct link, a direct connection deactivation response transmitted by the second device in response to the direct connection deactivation request, and deactivate the direct link based on the direct connection deactivation response.

In a possible implementation, the transmitting module 1003 is configured to determine, in response to that the device state of the first device is changed to a multimedia resource collection deactivation state, that the role of the first device during the voice call is changed and the role is changed to a listener, and transmit the direct connection deactivation request to the second device through the direct link if a role of the second device during the voice call is a listener, the listener being a device configured to receive the multimedia resource outputted by the presenter during the voice call; and determine, in response to that the device state of the first device is changed to a voice call exiting state, that the role of the first device during the voice call is changed and the role is changed to no role, and transmit the direct connection deactivation request to the second device through the direct link, the no role being a device not participating in the voice call.

In the foregoing apparatus, when the role of the first device is changed to the presenter during the voice call, the second device is determined from the at least one terminal device participating in the same voice call as the first device, and the direct link is created between the first device and the second device, to implement dynamic creation of the direct link. The multimedia resource of the first device is transmitted to the second device through the direct link, to reduce a transmission delay and a packet loss rate of the multimedia resource. In addition, the multimedia resource of the first device is transmitted to the server, to enable the server to forward the multimedia resource of the first device to the second device, thereby improving transmission quality of the multimedia resource.

When the apparatus provided in FIG. 10 implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same conception. For the specific implementation process, reference may be made to the method embodiments, and details are not described herein again.

Figure 11:
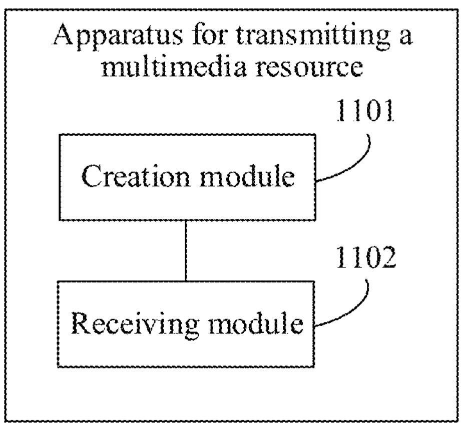
FIG. 11 is a schematic structural diagram of another apparatus for transmitting a multimedia resource according to an embodiment of this application.

FIG. 11 is a schematic structural diagram of an apparatus for transmitting a multimedia resource according to an embodiment of this application. As shown in FIG. 11, the apparatus includes:

a creation module 1101, configured to create a direct link between the second device and a first device in response to receiving a direct connection request transmitted by the first device and forwarded by a server, the second device being determined, by the first device, from at least one terminal device participating in the same voice call as the first device, when a role of the first device during the voice call is changed to a presenter, the presenter being a device configured to output a multimedia resource during the voice call; and a receiving module 1102, configured to receive, through the direct link, a multimedia resource of the first device transmitted by the first device, the receiving module 1102 being further configured to receive the multimedia resource of the first device forwarded by the server.

In a possible implementation, the creation module 1101 is configured to receive a direct connection request with respect to the second device forwarded by the server, the direct connection request being transmitted by the first device to the server, and the direct connection request carrying an external network address of the first device; transmitting a direct connection response in response to the direct connection request to the server, the direct connection response carrying an external network address of the second device; and creating the direct link between the second device and the first device based on the external network address of the first device and the external network address of the second device.

In a possible implementation, the creation module 1101 is configured to transmit a plurality of direct connection packets to the first device based on the external network address of the first device; and determine, when receiving a reception response transmitted by the first device, that the direct link between the second device and the first device has been established, the reception response being response information fed back by the second device for the direct connection packets based on the external network address of the first device.

In a possible implementation, the receiving module 1102 is configured to receive, through the direct link, an audio resource of the first device transmitted by the first device; and receive, through the direct link, a video resource of the first device transmitted by the first device, the video resource being transmitted through the direct link in a case that a first transmitting condition is satisfied, the first transmitting condition being that an available uplink bandwidth of the first device is not less than a product of a video bitrate of the video resource of the first device and a reference quantity.

In a possible implementation, the receiving module 1102 is configured to receive, through the direct link, an audio resource of the first device transmitted by the first device; and receive, through the direct link, a video resource of the first device transmitted by the first device, the video resource being transmitted through the direct link in a case that a second transmitting condition is satisfied, the second transmitting condition being that an available uplink bandwidth of the first device is less than a product of a video bitrate of the video resource of the first device and a reference quantity, and the second device satisfies a transmission condition.

In a possible implementation, the receiving module 1102 is further configured to receive the audio resource of the first device forwarded by the server; and receive a video resource of the first device forwarded by the server, the video resource being forwarded by the server in a case that a third transmitting condition is satisfied, the third transmitting condition being that an available uplink bandwidth of the first device is less than a product of a video bitrate of the video resource of the first device and a reference quantity, and the second device does not satisfy a transmission condition.

In a possible implementation, that the second device satisfies the transmission condition includes: a direct connection packet utilization of the second device is not less than a second utilization threshold, the direct connection packet utilization of the second device representing a proportion of packets that are transmitted through the direct link and that are used by the second device.

In a possible implementation, the receiving module 1102 is further configured to receive, through the direct link, a direct connection deactivation request transmitted by the first device, the direct connection deactivation request being transmitted to the second device when the role of the first device is changed during the voice call.

The apparatus further includes:

a transmitting module, configured to transmit, through the direct link, a direct connection deactivation response to the first device in response to the direct connection deactivation request, and deactivating the direct link based on the direct connection deactivation response.

In the foregoing apparatus, when the role of the first device is changed to the presenter during the voice call, the second device is determined from the at least one terminal device participating in the same voice call as the first device, and the direct link is created between the first device and the second device, to implement dynamic creation of the direct link. The multimedia resource of the first device is transmitted to the second device through the direct link, to reduce a transmission delay and a packet loss rate of the multimedia resource. In addition, the multimedia resource of the first device is transmitted to the server, to enable the server to forward the multimedia resource of the first device to the second device, thereby improving transmission quality of the multimedia resource.

When the apparatus provided in FIG. 11 implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same conception. For the specific implementation process, reference may be made to the method embodiments, and details are not described herein again.

Figures 12, 13:
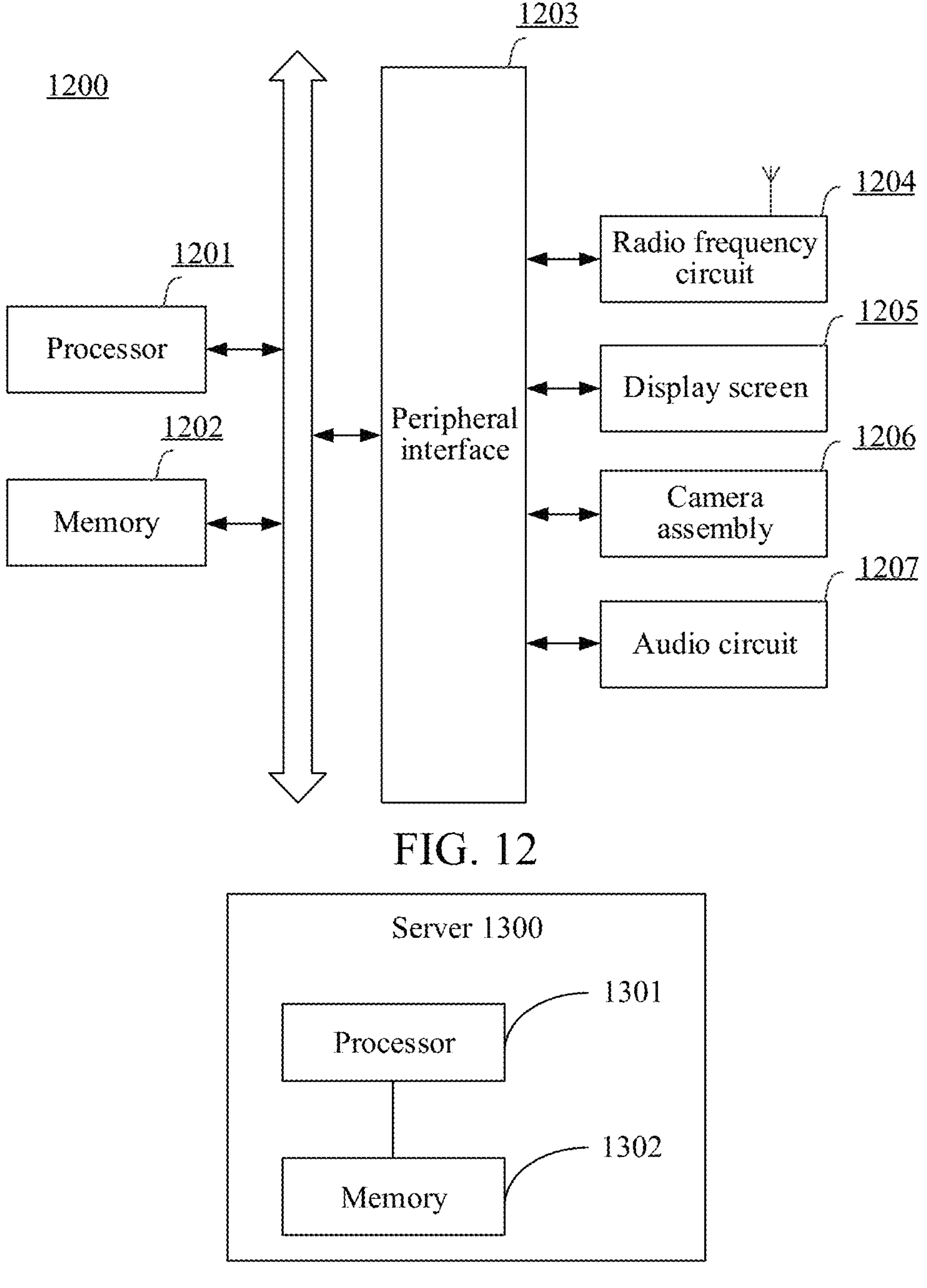
FIG. 12 is a schematic structural diagram of a terminal device according to an embodiment of this application.
FIG. 13 is a schematic structural diagram of a server according to an embodiment of this application.

FIG. 12 is a structural block diagram of a terminal device 1200 according to an exemplary embodiment of this application. The terminal device 1200 includes a processor 1201 and a memory 1202.

The processor 1201 may include one or more processing cores, and may be, for example, a 4-core processor or an 8-core processor. The processor 1201 may be implemented by using at least one hardware form of a digital signal processor (DSP), a field-programmable gate array (FPGA), and a programmable logic array (PLA). The processor 1201 may also include a main processor and a coprocessor. The main processor is configured to process data in an active state, also referred to as a central processing unit (CPU). The coprocessor is a low-power processor configured to process data in a standby state. In some embodiments, the processor 1201 may be integrated with a graphics processing unit (GPU). The GPU is configured to render and draw content that needs to be displayed on a display. In some embodiments, the processor 1201 may further include an artificial intelligence (AI) processor. The AI processor is configured to process a computing operation related to machine learning.

The memory 1202 may include one or more computer-readable storage media that may be non-transitory. The memory 1202 may further include a high-speed random access memory and a non-volatile memory, for example, one or more disk storage devices or flash storage devices. In some embodiments, the non-transient computer-readable storage medium in the memory 1202 is configured to store at least one computer program. The at least one computer program is configured to be executed by the processor 1201 to implement the method for transmitting a multimedia resource provided in the method embodiments of this application.

In some embodiments, the terminal device 1200 may include: a peripheral interface 1203 and at least one peripheral. The processor 1201, the memory 1202, and the peripheral interface 1203 may be connected by using a bus or a signal cable. Each peripheral may be connected to the peripheral interface 1203 by using a bus, a signal cable, or a circuit board. Specifically, the peripheral includes: at least one of a radio frequency (RF) circuit 1204, a display screen 1205, a camera assembly 1206, and an audio circuit 1207.

The peripheral interface 1203 may be configured to connect at least one input/output (I/O)-related peripheral to the processor 1201 and the memory 1202. In some embodiments, the processor 1201, the memory 1202, and the peripheral interface 1203 are integrated on the same chip or the same circuit board. In some other embodiments, any or two of the processor 1201, the memory 1202, and the peripheral interface 1203 may be implemented on an independent chip or circuit board. This is not limited in this embodiment.

The radio frequency circuit 1204 is configured to receive and transmit a radio frequency (RF) signal that is also referred to as an electromagnetic signal. The RF circuit 1204 communicates with a communication network and other communication devices through the electromagnetic signal. The RF circuit 1204 converts an electrical signal into an electromagnetic signal for transmission, or converts a received electromagnetic signal into an electrical signal. In an embodiment, the RF circuit 1204 includes: an antenna system, an RF transceiver, one or more amplifiers, a tuner, an oscillator, a digital signal processor, a codec chip set, a subscriber identity module card, and the like. The RF circuit 1204 may communicate with other terminals by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a Wi-Fi network. In some embodiments, the RF 1204 may further include a circuit related to Near-Field Communication (NFC), which is not limited in this application.

The display screen 1205 is configured to display a user interface (UI). The UI may include graphics, text, icons, videos, and any combination thereof. When the display screen 1205 is a touch display screen, the display screen 1205 is further capable of collecting touch signals on or above a surface of the display screen 1205. The touch signal may be inputted to the processor 1201 for processing as a control signal. In this case, the display screen 1205 may be further configured to provide a virtual button and/or a virtual keyboard that are/is also referred to as a soft button and/or a soft keyboard. In some embodiments, there may be one display screen 1205 disposed on a front panel of the terminal device 1200. In some other embodiments, there are at least two display screens 1205, arranged on different surfaces of the terminal device 1200 respectively or in a folded design. In some other embodiments, the display screen 1205 may be a flexible display screen, arranged on a curved surface or a folded surface of the terminal device 1200. The display screen 1205 may further be set to have a non-rectangular irregular graph, that is, a special-shaped screen. The display screen 1205 may be prepared by using materials such as a liquid-crystal display (LCD), an organic light-emitting diode (OLED), or the like.

The camera assembly 1206 is configured to collect images or videos. In an embodiment, the camera assembly 1206 includes a front-facing camera and a rear-facing camera. Generally, the front-facing camera is arranged on the front panel of the terminal, and the rear-facing camera is arranged on a back surface of the terminal. In some embodiments, there are at least two rear-facing cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera assembly 1206 may further include a flashlight. The flash may be a single color temperature flash, or may be a double color temperature flash. The double color temperature flash refers to a combination of a warm flash and a cold flash, and may be used for light compensation at different color temperatures.

The audio circuit 1207 may include a microphone and a speaker. The microphone is configured to collect sound waves of users and surroundings, and convert the sound waves into electrical signals and input the signals to the processor 1201 for processing, or input the signals to the RF circuit 1204 to implement voice communication. For stereo acquisition or noise reduction, there may be a plurality of microphones that are respectively arranged at different portions of the terminal device 1200. The microphone may be further an array microphone or an omnidirectional microphone. The speaker is configured to convert electrical signals from the processor 1201 or the RF circuit 1204 into sound waves. The speaker may be a conventional thin-film speaker or a piezoelectric ceramic speaker. When the speaker is the piezoelectric ceramic speaker, the speaker can not only convert electrical signals into sound waves audible to a human being, but also convert electrical signals into sound waves inaudible to the human being for ranging and other purposes. In some embodiments, the audio circuit 1207 may further include a headphone jack.

A person skilled in the art may understand that the structure shown in FIG. 12 does not constitute a limitation to the terminal device 1200, and the electronic device may include more components or fewer components than those shown in the figure, or some components may be combined, or a different component deployment may be used.

FIG. 13 is a schematic structural diagram of a server 1300 according to an embodiment of this application. The server 1300 may vary greatly because a configuration or performance varies, and may include one or more processors 1301 and one or more memories 1302. The one or more memories 1302 have at least one computer program stored. The at least one computer program is loaded and executed by the one or more processors 1301 to implement the method for transmitting a multimedia resource provided in the foregoing various method embodiments. For example, the processor 1301 is a CPU. Certainly, the server 1300 may also have a wired or wireless network interface, a keyboard, an input/output interface and other components to facilitate input/output. The server 1300 may also include other components for implementing device functions. Details are not described herein again.

In an exemplary embodiment, a computer-readable storage medium is further provided. The computer-readable storage medium has at least one computer program stored therein, the at least one computer program being loaded and executed by a processor, to enable an electronic device to implement the method for transmitting a multimedia resource according to any one of the foregoing aspects.

In an embodiment, the computer-readable storage medium may be a read-only memory (ROM), a random access memory (RAM), a compact disc read-only memory (CD-ROM), a magnetic tape, a floppy disk, an optical data storage device, and the like.

In an exemplary embodiment, a computer program or a computer program product is further provided. The computer program or the computer program product has at least one computer program stored therein. The at least one computer program is loaded and executed by a processor, to enable the electronic device to implement the method for transmitting a multimedia resource according to any one of the foregoing aspects.

That "plurality of" mentioned in this specification means two or more. And/or describes an association relationship for describing associated objects and represents that three relationships may exist. For example, A and/or B may represent the following three cases: Only A exists, both A and B exist, and only B exists. The character "/" generally indicates an "or" relationship between associated objects.

The sequence numbers of the foregoing embodiments of this application are merely for description purpose, and do not indicate the preference among the embodiments.

The foregoing descriptions are merely exemplary embodiments of this application, but are not intended to limit this application. Any modification, equivalent replacement, or improvement made within the principle of this application shall fall within the protection scope of this application.

What is claimed is:

1. A multimedia resource transmission method comprising:

determining, by a first device in response to that a role of the first device during a voice call is changed to a presenter, a second device from at least one terminal device participating in a same voice call as the first device, the presenter being a device configured to output multimedia during the voice call;

creating, by the first device, a direct link between the first device and the second device;

transmitting, by the first device, a multimedia resource to the second device through the direct link; and transmitting, by the first device, the multimedia resource to a server, to enable the server to forward the multimedia resource to the second device.

2. The method according to claim 1, further comprising, before determining the second device:

obtaining, by the first device in response to that a device state of the first device is changed to an audio resource collection state, an audio resource collected by the first device; and determining, by the first device in response to that object audio is detected in the collected audio resource, that the role of the first device during the voice call is changed to the presenter.

3. The method according to claim 1, further comprising, before determining the second device:

determining, by the first device in response to that a device state of the first device is changed to a video resource collection state, that the role of the first device during the voice call is changed to the presenter.

4. The method according to claim 1, wherein creating the direct link between the first device and the second device includes:

transmitting, by the first device, a direct connection request with respect to the second device to the server, the direct connection request carrying an external network address of the first device;

receiving, by the first device, a direct connection response forwarded by the server, the direct connection response being response information transmitted by the second device to the server in response to the direct connection request forwarded by the server to the second device, the direct connection response carrying an external network address of the second device;

extracting, by the first device, the external network address of the second device from the direct connection response; and creating, by the first device, the direct link between the first device and the second device based on the external network address of the first device and the external network address of the second device.

5. The method according to claim 4, wherein creating the direct link between the first device and the second device based on the external network address of the first device and the external network address of the second device includes:

transmitting, by the first device, a plurality of direct connection packets to the second device based on the external network address of the second device; and determining, by the first device in response to receiving a reception response transmitted by the second device, that the direct link between the first device and the second device has been established, the reception response being response information fed back by the second device for the direct connection packets based on the external network address of the first device.

6. The method according to claim 1, wherein:

the multimedia resource includes an audio resource;

the server forwards the audio resource to the second device in response to that a forwarding condition is satisfied, the forwarding condition being that a relay packet utilization of the second device is greater than a utilization threshold, the relay packet utilization of the second device being a ratio of a quantity of packets that are forwarded by the server and that are used by the second device over a total quantity of packets used by the second device; and the server stops forwarding the audio resource to the second device in response to that the forwarding condition is not satisfied.

7. The method according to claim 1, wherein:

the multimedia resource includes an audio resource and a video resource; and transmitting the multimedia resource to the second device through the direct link includes:

transmitting, by the first device, the audio resource to the second device through the direct link;

determining, by the first device, a video bitrate of the video resource; and transmitting, by the first device, the video resource to the second device through the direct link in response to that an available uplink bandwidth of the first device is not less than a product of the video bitrate of the video resource and a reference quantity.

8. The method according to claim 1, wherein:

the multimedia resource includes an audio resource and a video resource;

transmitting the multimedia resource to the second device through the direct link includes:

transmitting, by the first device, the audio resource to the second device through the direct link;

determining, by the first device, a video bitrate of the video resource; and transmitting, by the first device, the video resource of the first device to the second device through the direct link in response to that an available uplink bandwidth of the first device is less than a product of the video bitrate of the video resource of the first device and a reference quantity, and the second device satisfies a transmission condition; and transmitting, by the first device, the multimedia resource to the server includes:

transmitting, by the first device, the audio resource to the server, to enable the server to forward the audio resource to the second device; and transmitting, by the first device, the video resource to the server to enable the server to forward the video resource to the second device, in response to that the available uplink bandwidth of the first device is less than the product of the video bitrate of the video resource and the reference quantity, and the second device does not satisfy the transmission condition.

9. The method according to claim 8, wherein the second device satisfying the transmission condition includes:

a direct connection packet utilization of the second device is not less than a utilization threshold, the direct connection packet utilization of the second device being a ratio of a quantity of packets that are transmitted through the direct link and that are used by the second device over a total quantity of packets used by the second device.

10. The method according to claim 1, further comprising, after creating the direct link:

transmitting, by the first device, a direct connection deactivation request to the second device through the direct link in response to that the role of the first device during the voice call is changed;

receiving, by the first device through the direct link, a direct connection deactivation response transmitted by the second device in response to the direct connection deactivation request; and deactivating the direct link based on the direct connection deactivation response.

11. The method according to claim 10, wherein transmitting the direct connection deactivation request to the second device includes:

in response to that a device state of the first device is changed to a multimedia resource collection deactivation state:

determining, by the first device, that the role of the first device during the voice call is changed and the role is changed to a listener, the listener being a device configured to receive the multimedia resource outputted by the presenter during the voice call; and transmitting, by the first device in response to a role of the second device during the voice call being a listener, the direct connection deactivation request to the second device through the direct link; and in response to that the device state of the first device is changed to a voice call exiting state:

determining, by the first device, that the role of the first device during the voice call is changed and the role is changed to no role, the no role being a device not participating in the voice call; and transmitting, by the first device, the direct connection deactivation request to the second device through the direct link.

12. An electronic device comprising:

at least one processor; and at least one memory storing at least one computer program that, when being loaded and executed by the at least one processor, causes the electronic device to perform the method according to claim 1.

13. A non-transitory computer-readable storage medium storing at least one computer program that, when being loaded and executed by at least one processor, causes the at least one processor to perform the method according to claim 1.

14. A multimedia resource transmission method comprising:

in response to a direct connection request of a first device forwarded by a server, creating, by a second device, a direct link between the second device and the first device, the second device being determined from at least one terminal device participating in a same voice call as the first device when a role of the first device during the voice call is changed to a presenter, the presenter being a device configured to output multimedia during the voice call;

receiving, by the second device through the direct link, a multimedia resource transmitted by the first device; and receiving, by the second device, the multimedia resource forwarded by the server.

15. The method according to claim 14, wherein receiving the multimedia resource transmitted by the first device includes:

receiving, by the second device through the direct link, an audio resource transmitted by the first device; and receiving, by the second device through the direct link, a video resource transmitted by the first device, the video resource being transmitted through the direct link in a response to that an available uplink bandwidth of the first device is not less than a product of a video bitrate of the video resource and a reference quantity.

16. The method according to claim 14, wherein receiving the multimedia resource transmitted by the first device includes:

receiving, by the second device through the direct link, an audio resource transmitted by the first device; and receiving, by the second device through the direct link, a video resource transmitted by the first device, the video resource being transmitted through the direct link in response to that an available uplink bandwidth of the first device is less than a product of a video bitrate of the video resource and a reference quantity, and the second device satisfies a transmission condition.

17. The method according to claim 16, wherein the second device satisfying the transmission condition includes:

a direct connection packet utilization of the second device is not less than a utilization threshold, the direct connection packet utilization of the second device being a ratio of a quantity of packets that are transmitted through the direct link and that are used by the second device over a total quantity of packets used by the second device.

18. The method according to claim 14, wherein receiving the multimedia resource forwarded by the server includes:

receiving, by the second device, an audio resource of the first device forwarded by the server; and receiving, by the second device, a video resource of the first device forwarded by the server, the video resource being forwarded by the server in response to that an available uplink bandwidth of the first device is less than a product of a video bitrate of the video resource and a reference quantity, and the second device does not satisfy a transmission condition.

19. The method according to claim 14, further comprising, after creating the direct link:

receiving, by the second device through the direct link, a direct connection deactivation request transmitted by the first device, the direct connection deactivation request being transmitted to the second device in response to the role of the first device being changed during the voice call; and transmitting, by the second device through the direct link, a direct connection deactivation response to the first device in response to the direct connection deactivation request, and deactivating the direct link based on the direct connection deactivation response.

20. A system comprising:

a first device;

a second device; and a server;

wherein:

the first device is configured to:

determine, in response to that a role of the first device during a voice call is changed to a presenter, the second device from at least one terminal device participating in a same voice call as the first device, the presenter being a device configured to output multimedia during the voice call;

create a direct link between the first device and the second device;

transmit a multimedia resource to the second device through the direct link; and transmit the multimedia resource to the server;

the second device is configured to:

in response to a direct connection request of the first device forwarded by the server, establish the direct link between the second device and the first device;

receive, through the direct link, the multimedia resource transmitted by the first device; and receive the multimedia resource forwarded by the server; and the server is configured to forward the multimedia resource and the direct connection request received from the first device to the second device.

* * * * *